US012694686B2

(12) United States Patent　　　　　(10) Patent No.:　US 12,694,686 B2
Krishnan et al.　　　　　　　　　　　(45) Date of Patent:　　Jul. 28, 2026

(54) SYSTEMS AND METHODS FOR MULTI-MODAL VISUAL REASONING USING KNOWLEDGE GRAPHS MAINTAINED OVER A PERIOD OF TIME

(71) Applicant: QpiAI India Private Limited, Bangalore (IN)

(72) Inventors: Aswanth Krishnan, Bengaluru (IN); Lakshya Priyadarshi, Lucknow (IN); Sachin Kumar, Bengaluru (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/327,324

(22) Filed: Sep. 12, 2025

(65) Prior Publication Data

US 2026/0126798 A1　　May 7, 2026

(30) Foreign Application Priority Data

Nov. 5, 2024　(IN) ............................. 202441084635

(51) Int. Cl.
　*G05D 1/246*　　　(2024.01)
　*G05D 1/617*　　　(2024.01)
　*G06N 5/025*　　　(2023.01)
(52) U.S. Cl.
　CPC ........... *G05D 1/2462* (2024.01); *G05D 1/617* (2024.01); *G06N 5/025* (2013.01)
(58) Field of Classification Search
　CPC ......... B60W 30/0956; B60W 50/0097; B60W 2554/4045; B60W 2554/40; B60W

2554/20; B60W 2520/10; B60W 2554/402

See application file for complete search history.

(56) References Cited

U.S. PATENT DOCUMENTS

| | | | | |
|---|---|---|---|---|
| 5,850,341 | A * | 12/1998 | Fournier | ............... E02F 9/2045 |
| | | | | 701/34.2 |
| 9,487,931 | B2 * | 11/2016 | Atkinson | ................ G01S 17/00 |
| 10,290,116 | B2 * | 5/2019 | Laugier | ................. B60W 40/04 |

(Continued)

OTHER PUBLICATIONS

Non-Final Office Action on U.S. Appl. No. 19/327,240 dtd Nov. 26, 2025.

(Continued)

*Primary Examiner* — Redhwan K Mawari
(74) *Attorney, Agent, or Firm* — Foley & Lardner LLP

(57) ABSTRACT

A system for processing multi-modal data representing an environment to generate scene graphs of the environment is described. The system can obtain sensor data associated with a vehicle operating in the environment. In examples, the system can determine a set of features from the sensor data, including one or more objects and one or more agents present in the environment, and can generate a scene graph that represents the poses and velocities of these objects and agents relative to the environment. In some examples, based on generating the scene graph, the system can generate a knowledge graph by encoding the relationships among the identified objects and agents. In some examples, the system can generate a control signal, using attributes that represent the states of objects and agents in the knowledge graph, and provide this control signal to the vehicle in order to adjust or cause the operation of the vehicle.

20 Claims, 11 Drawing Sheets

(56) References Cited

U.S. PATENT DOCUMENTS

| | | | |
|---|---|---|---|
| 10,776,880 B2 * | 9/2020 | Dalal | G06N 3/0475 |
| 10,832,439 B1 | 11/2020 | Ma et al. | |
| 11,054,265 B2 * | 7/2021 | Geissler | G01C 21/3841 |
| 11,599,749 B1 * | 3/2023 | Ziaeefard | G06N 3/08 |
| 11,639,173 B2 * | 5/2023 | Niewiadomski | B60W 30/06 |
| | | | 701/26 |
| 11,860,932 B2 * | 1/2024 | Maheshwari | G06N 3/0464 |
| 11,899,114 B1 | 2/2024 | Kroeger et al. | |
| 12,045,610 B1 * | 7/2024 | Myers | G06F 8/60 |
| 12,210,858 B1 * | 1/2025 | Silver | G06F 8/60 |
| 12,210,949 B1 * | 1/2025 | Silver | G06F 8/60 |
| 12,249,191 B2 | 3/2025 | Loesch | |
| 12,271,720 B1 * | 4/2025 | Silver | G06F 8/60 |
| 12,406,194 B1 | 9/2025 | Cosic | |
| 12,468,733 B2 * | 11/2025 | Alesiani | G06F 16/284 |
| 2007/0121087 A1 * | 5/2007 | Garg | G03B 21/145 |
| | | | 353/119 |
| 2018/0307941 A1 | 10/2018 | Holz et al. | |
| 2018/0341821 A1 | 11/2018 | Hovis et al. | |
| 2019/0018419 A1 | 1/2019 | Lee et al. | |
| 2019/0050942 A1 * | 2/2019 | Dalal | G06N 3/0475 |
| 2019/0329762 A1 | 10/2019 | Kwon | |
| 2020/0081445 A1 | 3/2020 | Stetson et al. | |
| 2020/0086855 A1 * | 3/2020 | Packer | G05D 1/0289 |
| 2020/0172105 A1 | 6/2020 | Ahmed et al. | |
| 2020/0250608 A1 * | 8/2020 | Sharma | G06Q 10/06395 |
| 2020/0251006 A1 * | 8/2020 | Sharma | G06N 20/00 |
| 2020/0290620 A1 | 9/2020 | Al Qizwini et al. | |
| 2020/0311462 A1 * | 10/2020 | Papon | G06V 10/806 |
| 2021/0275918 A1 * | 9/2021 | Devaranjan | G06V 20/20 |
| 2021/0334700 A1 * | 10/2021 | Nagaraja | G06N 10/60 |
| 2021/0380130 A1 | 12/2021 | Narang et al. | |
| 2022/0128367 A1 | 4/2022 | Uchida et al. | |
| 2022/0161830 A1 * | 5/2022 | Devassy | B60W 50/0097 |
| 2022/0245533 A1 * | 8/2022 | Krishnan | G06Q 10/06312 |
| 2022/0269971 A1 * | 8/2022 | Garg | H10N 60/20 |
| 2022/0355819 A1 | 11/2022 | Yu et al. | |
| 2022/0391433 A1 * | 12/2022 | Maheshwari | G06V 10/426 |
| 2022/0398484 A1 * | 12/2022 | Padalia | G06N 10/80 |
| 2023/0127121 A1 | 4/2023 | Henson et al. | |
| 2023/0192090 A1 * | 6/2023 | Pendleton | B60W 30/18154 |
| | | | 701/117 |
| 2023/0214553 A1 * | 7/2023 | Mukherjee | G06N 10/60 |
| | | | 703/8 |
| 2023/0230484 A1 | 7/2023 | Al Faruque et al. | |
| 2023/0286539 A1 | 9/2023 | Malloch et al. | |
| 2023/0418840 A1 * | 12/2023 | Alesiani | G06F 16/284 |
| 2024/0101144 A1 | 3/2024 | Marzorati et al. | |
| 2024/0135197 A1 * | 4/2024 | Vinay | G06N 5/022 |
| 2024/0160929 A1 * | 5/2024 | Jia | G06N 5/022 |
| 2024/0246575 A1 | 7/2024 | Huang et al. | |
| 2024/0330645 A1 | 10/2024 | Oltramari | |
| 2025/0022224 A1 * | 1/2025 | Arar | G06T 17/05 |
| 2025/0074331 A1 * | 3/2025 | Shenoy | B60R 1/28 |
| 2025/0086979 A1 | 3/2025 | Narayanan et al. | |
| 2025/0190818 A1 | 6/2025 | Shrivastava | |
| 2025/0190884 A1 * | 6/2025 | Silver | G06F 8/60 |
| 2025/0242491 A1 | 7/2025 | Halilaj et al. | |
| 2025/0259047 A1 * | 8/2025 | Crabtree | G06N 5/022 |
| 2025/0307668 A1 | 10/2025 | Sankaradas et al. | |

OTHER PUBLICATIONS

Non-Final Office Action on U.S. Appl. No. 19/327,457 dtd Nov. 5, 2025.

* cited by examiner

Environment 100

300

Figure 5:
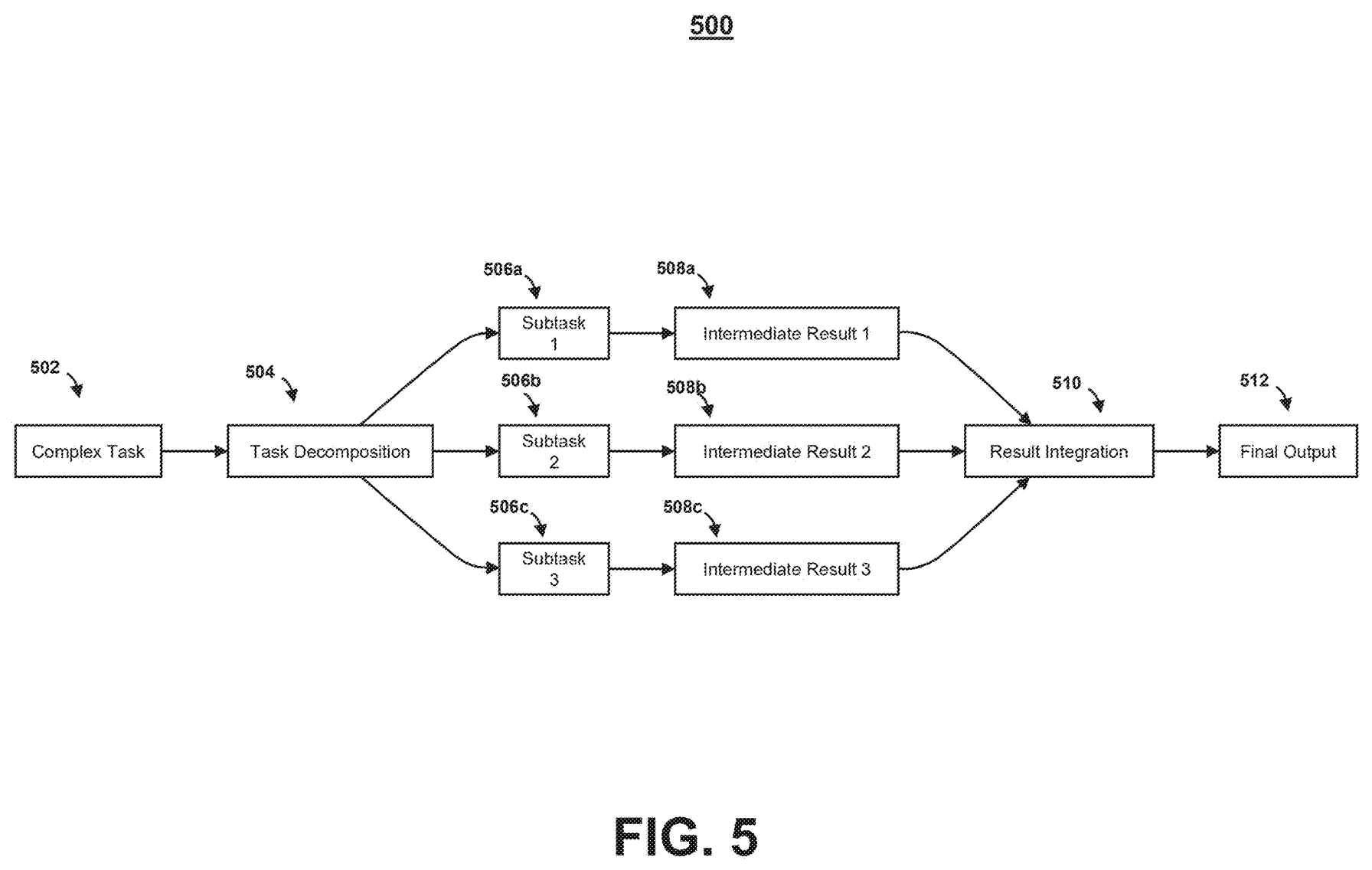

500

502 → Complex Task

504 → Task Decomposition

506a → Subtask 1

506b → Subtask 2

506c → Subtask 3

508a → Intermediate Result 1

508b → Intermediate Result 2

508c → Intermediate Result 3

510 → Result Integration

512 → Final Output

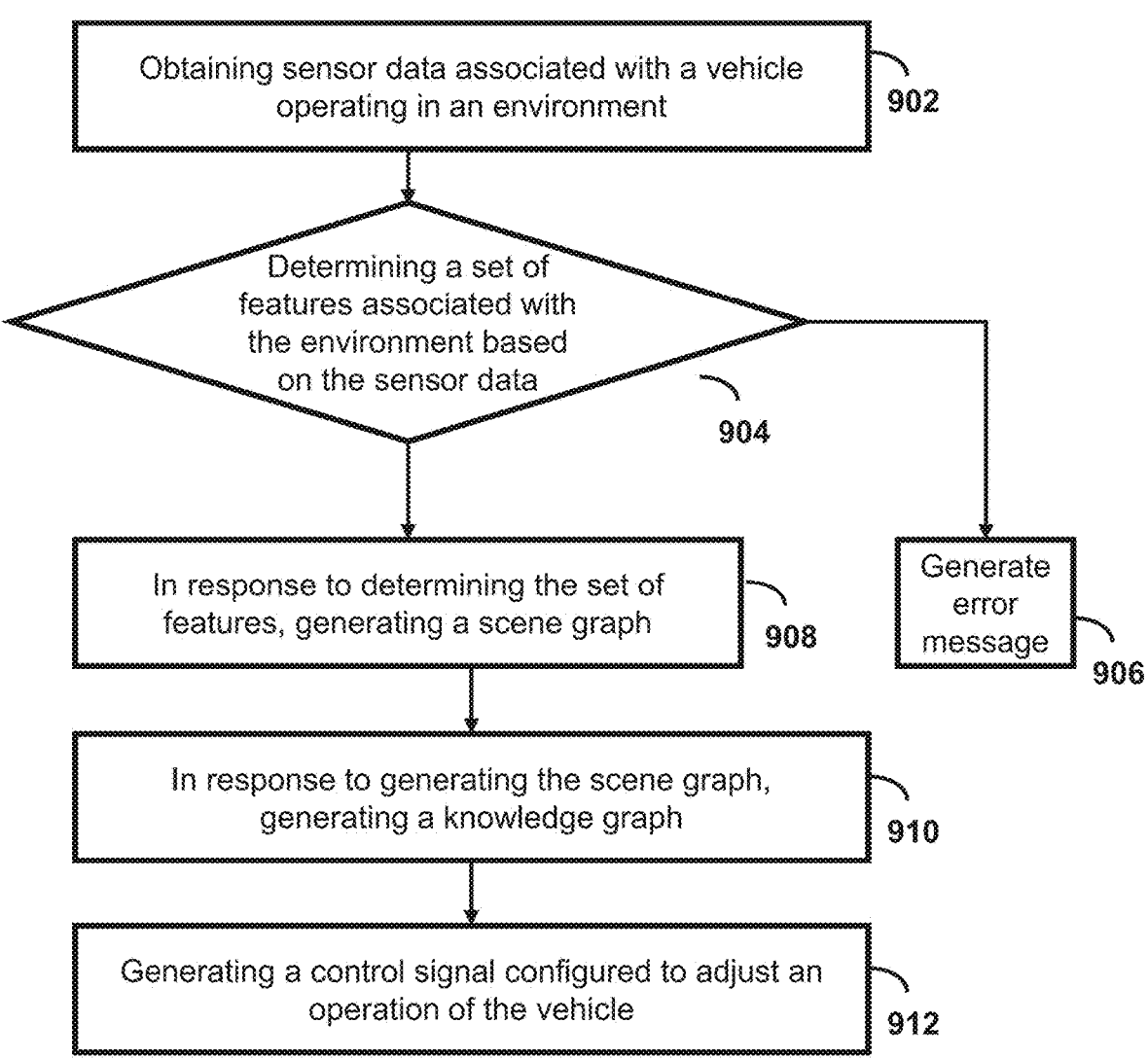

Obtaining sensor data associated with a vehicle operating in an environment — 902

Determining a set of features associated with the environment based on the sensor data — 904

In response to determining the set of features, generating a scene graph — 908

Generate error message — 906

In response to generating the scene graph, generating a knowledge graph — 910

Generating a control signal configured to adjust an operation of the vehicle — 912

Obtaining first sensor data at a first point in time 1102

Generate a knowledge graph based on the first sensor data 1104

Determine whether second sensor data is available 1106

Obtain second sensor data 1108

Determine one or more changes to relationships represented by the first sensor data and the second sensor data 1110

Update the knowledge graph 1112

Provide a control signal 1114

SYSTEMS AND METHODS FOR MULTI-MODAL VISUAL REASONING USING KNOWLEDGE GRAPHS MAINTAINED OVER A PERIOD OF TIME

CROSS-REFERENCE TO RELATED APPLICATIONS

This application claims the benefit of priority to Indian Provisional Application No. 202441084635, filed Nov. 5, 2024, the entirety of which is incorporated by reference herein.

BACKGROUND

Various automated vehicle systems and remote monitoring systems deployed in a variety of environments (e.g., drivable highways, warehouses, etc.) rely upon the acquisition and interpretation of multi-modal sensor data to perceive and interact with their surrounding environment. These systems commonly utilize data generated from devices such as cameras, lidar, radar, and ultrasonic sensors to detect objects and agents in proximity to a vehicle. Information from these heterogeneous sources is often fused in real time to generate structured representations, including object lists, semantic maps, or hierarchical graphs, that facilitate environmental understanding crucial to navigation and operation.

As automated vehicle deployments and remote monitoring systems increase in scope and complexity, significant technical challenges are arising. The high volume and diversity of sensor data require intensive computational resources for real time processing, particularly when deriving semantic relationships and dynamic parameters such as pose and velocity for each detected object or agent in a scene. The frequent need to transfer, store, and synchronize environmental data and contextual models results in substantial demands on both onboard memory and network bandwidth, especially during collaborative operations or remote diagnostic analyses. These pressures can lead to latency issues, increased energy consumption, and higher risks of data bottlenecks in resource constrained embedded platforms.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is a flow diagram illustrating a process for executing cascaded visual reasoning tasks by decomposing a complex task into subtasks and processing the tasks in parallel, in accordance with one or more embodiments;

FIG. 9 is a flowchart illustrating a method for processing multi-modal data representing an environment to generate scene graphs of the environment, in accordance with one or more embodiments;

DETAILED DESCRIPTION

Figure 1:
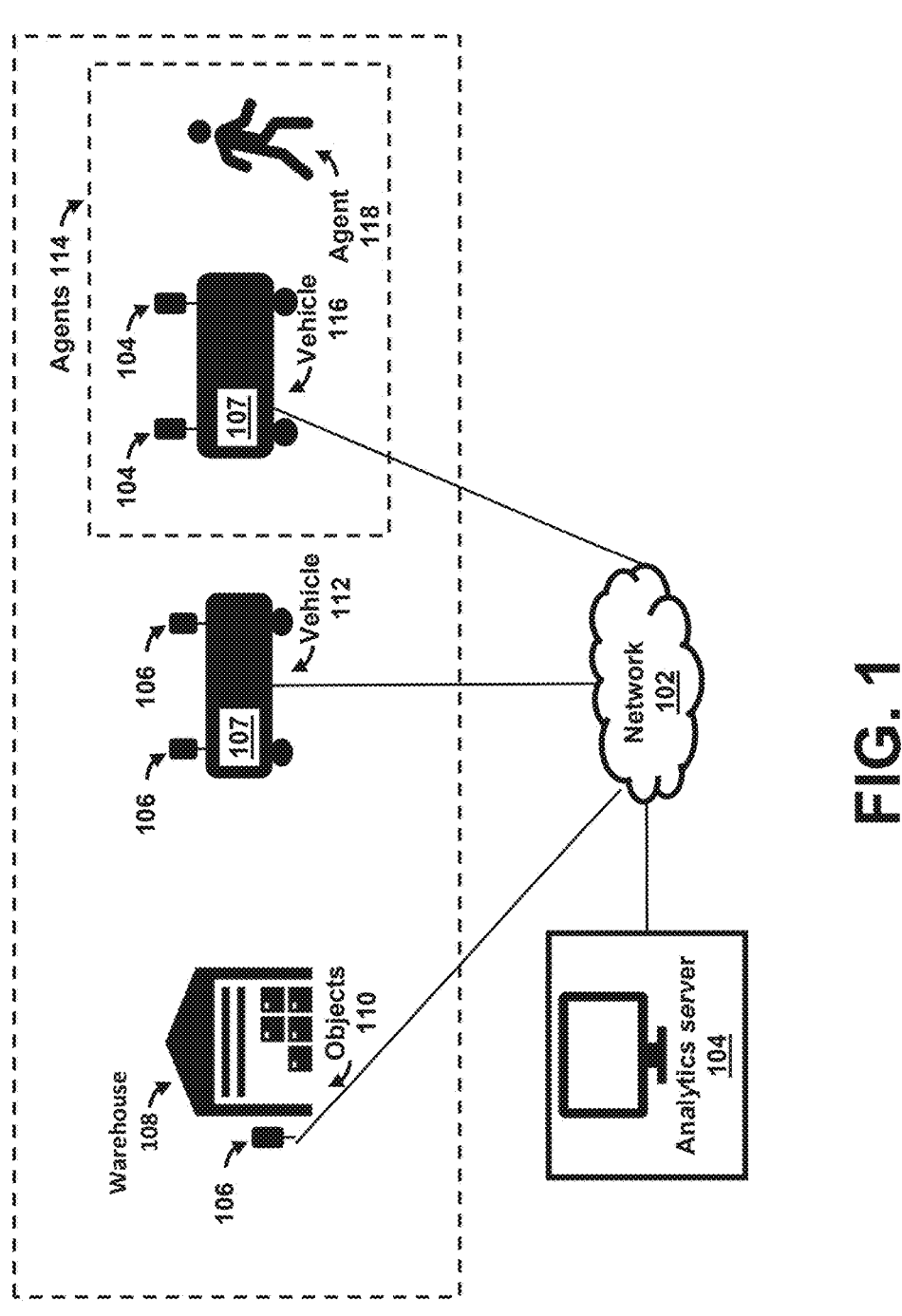
FIG. 1 is a block diagram illustrating an environment for processing multi-modal data representing an environment to generate scene graphs and/or knowledge graphs, in accordance with one or more embodiments.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

In examples, a system is provided for processing multi-modal data representing an environment to generate scene graphs of the environment. The system can operate in connection with one or more mobile platforms such as autonomous vehicles, aerial drones, automated guided vehicles (AGVs), or stationary monitoring stations (e.g., remote monitoring systems) such as fixed surveillance cameras (e.g., edge cameras) or industrial inspection systems. In some examples, the system includes one or more processors configured to obtain sensor data associated with a vehicle operating in an environment (e.g., a monitored environment), with the sensor data including a first portion associated with a first sensor and a second portion associated with a second sensor. The sensor data can be acquired from sensors on moving vehicles (e.g., platforms, etc.), or from edge devices deployed throughout a facility or geographic area. The processors can determine a set of features associated with the environment based on the sensor data, where the set of features includes one or more objects and one or more agents. In some examples, the processors generate a scene graph representing poses and velocities of the one or more objects and the one or more agents relative to the environment based on determining the set of features. In further examples, in response to generating the scene graph, the processors generate a knowledge graph based on the scene graph and stored contextual information, where the knowledge graph represents relationships involving the one or more objects and the one or more agents in the environment for use in strategic planning of the operation of the vehicle or analysis of the motion of the vehicle relative to objects and/or agents in proximity to (e.g., in a line of sight or within a predetermined distance to) the vehicle. Such strategic planning can include, for example, the coordination of robotics systems, or monitoring and/or alerting functions in a remote surveillance or manufacturing line context. In examples, the processors can generate a control signal configured to adjust an operation of the vehicle based on one or more first attributes representing first states of the one or more objects and/or one or more second attributes representing second states of the one or more agents from the knowledge graph.

By virtue of the implementation of the techniques described, a system can reduce computing processor and memory consumption during automated vehicle operation and/or operational analysis. For example, by obtaining sensor data and generating a scene graph to structure the information to include poses and velocities of objects and agents, the system can limit processing to only those elements in the environment that are relevant to the vehicle's decision-making process. And by converting sensor data into scene graphs and subsequently into knowledge graphs, only the necessary relationships and state attributes are stored and accessed, eliminating extraneous computations on raw or unstructured data. As a result, processor cycles and memory allocations are conserved because the system focuses resources on contextually relevant features for control and navigation actions.

In at least some examples, the system can also reduce network communication needed to interpret and utilize sensor data from automated vehicles. As an example, by generating both scene graphs and knowledge graphs onboard in response to locally obtained sensor data and contextual information, the system can eliminate or reduce the need to transmit voluminous raw sensor data to external processing nodes or remote servers. By exchanging only high-level scene or knowledge graph representations when communication is needed, bandwidth usage decreases because compact semantic structures replace raw or redundant information streams. As a result, the system can minimize network loads and associated latencies during vehicle operation within connected environments.

In some examples, a system implementing these techniques can yield improved accuracy in environmental understanding and vehicle control decisions. For example, the determination of a set of features using multi-modal sensor data, followed by the generation of scene and knowledge graphs to represent object and agent states and relationships, allows more granular and consistent contextual analysis than traditional methods that rely on isolated or less detailed sensor interpretation. By anchoring vehicle control to knowledge graph-derived attributes that accurately reflect real-time environmental relationships, the system reduces decision errors induced by incomplete or non-integrated data. As a result, strategic vehicle planning based on knowledge graphs can achieve more reliable and precise operational responses than approaches lacking these structured models.

In examples, a system is provided for processing multi-modal data representing an environment to generate scene graphs of the environment during automated operation of a vehicle. In some examples, the system includes one or more processors configured to obtain first sensor data associated with a first sensor at a first location in an environment and second sensor data associated with a second sensor at a second location that are in proximity to or a within a threshold distance of the first location. In examples, the processors generate a first local scene graph based on the first sensor data and a second local scene graph based on the second sensor data, where the first local scene graph represents a first portion of the environment visible from the first location and the second local scene graph represents a second portion of the environment visible from the second location. In some examples, the processors generate a knowledge graph based on the first local scene graph and the second local scene graph, where the knowledge graph comprises a composite representation of the environment.

By implementing at least some of the techniques described, a system can reduce computing processor and memory consumption associated with automated vehicle operation. For example, the system can generate a first local scene graph and a second local scene graph from first and second sensor data, representing separate portions of the environment, and then synthesize only a composite knowledge graph for strategic decisions. By organizing environmental data into localized scene graphs and then merging only essential elements into a knowledge graph, unnecessary duplication and storage of raw or redundant sensor data across the entire environment are avoided, focusing computational efforts on relevant representations. As a result, the system can achieve efficient processor utilization and reduced memory consumption compared to approaches that repeatedly analyze or store all raw sensor outputs in full detail.

In some examples, network communication demands can be reduced by a system employing the described techniques. For example, by obtaining sensor data from different but nearby locations and generating local scene graphs directly on the processors before merging the results into a composite knowledge graph, the system can allow most data processing to occur locally instead of requiring offboard transmission. By only transmitting higher-level or composite graph data, rather than large volumes of raw sensor data, bandwidth utilization is significantly decreased. As a result, the system can maintain network efficiency and avoid congestion during collaborative or automated vehicle implementations.

In at least some examples, a system configured as described can improve accuracy in environmental understanding and vehicle operations. For example, by precisely segmenting sensor data into multiple (e.g., first and second) local scene graphs based on spatial locality, and then combining these into a composite knowledge graph, the system can reduce the risk of ambiguity or loss of fidelity in the representation of localized features. By maintaining the distinctions between portions of the environment and then integrating them in a structured way, the likelihood of introducing errors or misinterpretations common in less structured or aggregated schemes is reduced. As a result, decisions derived from the system's knowledge graph can more reliably reflect real-world environmental structure and dynamics.

In implementing at least some of the techniques described, a system is provided for processing multi-modal data representing an environment during automated operation of a vehicle. In some examples, the system includes one or more processors configured to obtain first sensor data associated with a vehicle operating in an environment at a first point in time. In examples, the processors generate a knowledge graph based on the first sensor data, where the knowledge graph represents relationships involving one or more objects and one or more agents in the environment at the first point in time. In some examples, in response to obtaining second sensor data associated with the vehicle at a second point in time, the processors determine one or more changes to the relationships involving the one or more objects and the one or more agents. In further examples, the processors update the knowledge graph based on the one or more changes to the relationships. In examples, in response to updating the knowledge graph, the processors provide a control signal to adjust operation of the vehicle based on the knowledge graph or analysis of the motion of the vehicle relative to objects and/or agents in proximity to (e.g., in a line of sight or within a predetermined distance to) the vehicle.

As a result of the implementation of at least some of the techniques described herein, processor and memory consumption can be reduced by a system processing multi-modal data for automated vehicle operations. For example, the system can obtain first sensor data, generate a knowledge graph to represent only relevant relationships among objects and agents, and subsequently update the knowledge graph only when changes in relationships are determined from second sensor data. This approach avoids redundant data processing and reduces memory overhead by representing past and present environmental context efficiently through the knowledge graph rather than maintaining large volumes of raw sensor history. As a result, the system can conserve computational resources and storage requirements by focusing on incremental updates and structured knowledge representation.

In at least some examples, a system using these methods can reduce network communication during automated operation. For example, by locally constructing and updating knowledge graphs in response to sensor data at different time points, the system can minimize the need to transmit full raw sensor readings across a network or to external servers. The selective transmission of only the updated knowledge graph or control signals reduces bandwidth requirements, as opposed to continuous streaming of all environmental data. As a result, network load is minimized and operational latency associated with remote data processing is reduced.

In some examples, system accuracy can be improved compared to other systems that do not employ structured knowledge graph methodologies. For example, a knowledge graph derived from tracked changes in relationships between objects and agents can provide a coherent and up-to-date context for vehicle control, reducing errors associated with outdated or misinterpreted sensor data. By updating the knowledge graph only when actual relationship changes are detected, the risk of propagating sensor noise or irrelevant fluctuations is reduced, resulting in more reliable control decisions. As a result, the system can maintain greater environmental awareness and react more precisely to evolving vehicle surroundings.

Referring now to FIG. 1, illustrated is a block diagram of an environment 100 for processing multi-modal data representing an environment (e.g., a physical environment associated with a drivable surface (e.g., a highway, a warehouse, etc.), in which a vehicle is navigating) to generate scene graphs and/or knowledge graphs, in accordance with one or more embodiments. The environment 100 can include a network 102, an analytics server 104, sensors 106 that are supported by vehicles or fixed structures as described herein, devices 107, a warehouse 108, one or more objects 110, a vehicle 112, one or more agents 114, a vehicle 116, and a pedestrian 118. In some embodiments, one or more of the functions described with respect to operations can be performed (e.g., completely, partially, etc.) by the analytics server 104. Additionally, or alternatively, one or more of the functions described with respect to operations can be performed (e.g., completely, partially, etc.) by one or more other devices the environment 100, such as a device 107 (e.g., a device such as an on-vehicle computer, etc.) alone or in coordination with the analytics server 104.

In examples described, a scene graph is a structured representation of a physical environment in which entities such as objects and agents are represented as nodes, and relationships between those entities are represented as edges. The scene graph can be based on multi-modal sensor inputs, including but not limited to image frames, video streams, lidar or radar point clouds, depth maps, and associated contextual or textual data, as described. In examples, the scene graph may be generated by processing these inputs to detect and classify entities, determine their spatial properties (e.g., pose, position, orientation, and velocity) relative to one another and/or the environment, and identify semantic or functional relationships (e.g., proximity, containment, following, interaction) between them. In examples, generation of the scene graph can involve combining outputs from perception models, object detection pipelines, and relationship-mapping algorithms into a unified graph data structure annotated with node-and edge-level attributes such as confidence scores, timestamps, or source identifiers. In some embodiments, the scene graph can serve as an intermediate representation for the generation of a knowledge graph, wherein information from one or more scene graphs (e.g., across one or more points in time and/or across one or more viewpoints) is aggregated, contextualized, and enriched with external domain knowledge to create a persistent semantic model of the environment. This knowledge graph can then be used to support reasoning, planning, control signal generation, alerting, or other decision-making processes described herein.

In examples described, a knowledge graph can include a structured representation of the entities represented by one or more scene graphs, attributes of the entities, and/or relationships between the entities. For example, the knowledge graph can be derived from one or more scene graphs in combination with stored contextual and/or domain-specific information. The knowledge graph can be based on the aggregation and integration of data from multiple scene graphs captured at different times, locations, or from different sensing modalities, and may additionally incorporate information retrieved from external knowledge bases, operational rules, or historical records. In some examples, the knowledge graph can be generated by normalizing and merging overlapping entities, resolving conflicts between differing observations, and augmenting the graph with inferred or externally-sourced relationships. Nodes in the knowledge graph can correspond to persistent representations of objects or agents in the environment, enriched with attributes such as classification labels, behavioral patterns, state histories, or compliance indicators, while edges can represent spatial, temporal, causal, or functional relationships. The knowledge graph can be maintained over a period of time to represent a queryable model of the environment that supports a variety of downstream processes, including adaptive reasoning, predictive modeling, strategic path or task planning, safety monitoring, or automated control signal generation for vehicles or other autonomous systems as described herein.

In some embodiments, the environment 100 can include a network 102. The network 102 can include a communication infrastructure that can be used to establish one or more communication connections between the devices described herein and allow for data exchange between distributed system components. In some examples, the network 102 can include a wired or wireless network that can provide connectivity between edge devices, vehicles, sensors, or analytics servers etc. The network 102 can communicate sensor data from sensors 106, scene graph information generated by a scene graph generator, or control signals generated by a processor etc. In examples, the network 102 can transmit the sensor data, the scene graph information, or the control signals between components in the environment 100, such as between a device 107 of the vehicle 112 and/or vehicle 116, an analytics server 104, etc. The network 102 can implement secure protocols or bandwidth management techniques to provide real-time, multi-modal data transfer. For example, the network 102 can use secure Transmission Control Protocol/Internet Protocol (TCP/IP), Wi-Fi, 5G, etc., protocols to provide low-latency communication between the edge devices or the analytics server 104 etc. The network 102 can allow for adaptive deployment of visual reasoning systems by partitioning a visual reasoning pipeline that dynamically allocates systems (e.g., software and/or hardware systems, etc.) based on real-time resource availability, data privacy requirements, or latency constraints etc.

In embodiments, the environment 100 can include an analytics server 104. The analytics server 104 can include a centralized computing device or multiple computing devices forming a distributed computing environment that can process, analyze, or store data received from one or more other devices included in the environment 100. In some examples, the analytics server 104 can receive scene graphs generated by one or more devices in the environment 100, such as vehicles 112 or 116, or sensors 106. The analytics server 104 can aggregate and/or process the scene graphs. For example, the analytics server 104 can aggregate multiple scene graphs by processing two or more scene graphs to merge corresponding nodes and edges that represent the same or related entities or relationships. During this process, the analytics server 104 can reconcile differences between the scene graphs (e.g., by resolving conflicting attributes or positions based on confidence scores or contextual rules), and combine information derived from each graph into a single scene graph (sometimes referred to as a unified scene graph) that provides a complete representation of the environment as compared to the individual scene graphs. The analytics server 104 can determine whether the aggregated and/or processed scene graphs include overlapping entities (e.g., objects, agents, etc.), relationships, or attributes. In some examples, the analytics server 104 can determine whether the aggregated and/or processed scene graphs include overlapping entities, relationships, or attributes by comparing node identifiers, semantic labels, spatial coordinates, and/or temporal metadata across the individual scene graphs to detect matches or similarities exceeding one or more thresholds, such as proximity thresholds for positions or equivalence thresholds for classification labels, thereby identifying instances where multiple scene graphs represent the same real-world object, agent, or relationship. In response, the analytics server 104 can update a knowledge graph based on the aggregated scene graphs and stored contextual information.

In some examples, the analytics server 104 can execute reasoning tasks based on the knowledge graph. For example, the analytics server 104 can use and/or implement high-performance computing resources, machine learning models, retrieval-augmented generation systems, etc., to process incoming data and update knowledge graphs representing the state of the environment at one or more points in time. As an example, the analytics server 104 can run a multi-modal large language model to process visual data (e.g., images, scans, etc. associated with the environment in which vehicles are operating) or text inputs, generate and/or update unified representations (scene graphs and/or knowledge graphs as described herein), or update the knowledge graph with new scene graph information. When doing so, the analytics server 104 can cause the multi-modal large language model to receive as input structured scene graph data (e.g., serialized node-edge representations with associated attributes as described herein) and/or unstructured contextual data (e.g., textual descriptions, operational rules, or external knowledge base entries, etc.). The analytics server 104 can then execute the multi-modal large language model to align these inputs in a shared embedding space. Based on the correlation between the scene graph data and/or the contextual data, multi-modal large language model can infer new or modified relationships, resolve ambiguities in entity classification, enrich nodes or edges with additional attributes, and produce an updated, structured output that conforms to the schema of the knowledge graph based on the representation of the environment in the shared embedding space. The analytics server 104 can then parse this output from the multi-modal large language model and insert new entities, merge or reconcile overlapping nodes, and/or update edge definitions or confidence scores to the scene graphs and/or knowledge graphs as described herein based on the output of the multi-modal large language model. The analytics server 104 can maintain a knowledge base that can be queried for strategic planning, operational analysis, or downstream task execution. In some examples, the analytics server 104 can then provide updated knowledge graph data or reasoning results to other components in the environment 100, such as vehicles 112 or 116, or edge devices, via the network 102.

In some examples, the analytics server 104 can execute reasoning tasks based on the knowledge graph. For example, the analytics server 104 can use or implement high-performance computing resources, machine learning models, retrieval-augmented generation systems, or other systems to process incoming data or update a knowledge graph representing the environment. As an example, the analytics server 104 can run a multi-modal large language model or a dynamic knowledge graph integrator to process visual or text inputs, generate unified representations, or update the knowledge graph with new scene graph information. The analytics server 104 can maintain a knowledge base that can be queried for strategic planning, operational analysis, or downstream task execution associated with operation of the vehicle 112 and/or the vehicle 116. In some examples, the analytics server 104 can provide updated knowledge graph data or reasoning results to other components in the environment 100, such as the vehicle 112 and/or the vehicle 116, or edge devices, via the network 102. In some examples, the analytics server 104 can be implemented by the device 107 of the vehicle 112 or the vehicle 116 such that the device 107 can execute one or more operations described with respect to the analytics server 104, including operations corresponding to the processes depicted in FIGS. 2-8.

In examples, the environment 100 can include sensors 106 that can operate independently or in association with the vehicle 112, the vehicle 116, and/or one or more mobile or stationary platforms. The sensors 106 can include devices that can capture data from the environment 100 that are associated with traffic intersections, indoor factory floors, remote infrastructure inspection sites, etc. The multi-modal data can include visual, audio, or spatial information etc. For example, the sensors 106 can include cameras (e.g., visible spectrum or infrared), lidar sensors, radar sensors, ultrasonic sensors, hyperspectral cameras, or other transducers mounted in aerial drones, ground robots, stationary platforms (e.g., masts, etc.), overhead gantry systems, etc., that can be mounted on vehicles or infrastructure within the environment 100. In examples, the sensors 106 can provide input data for scene graph generation or environmental understanding. As an example, the sensors 106 can generate sensor data that can be received by one or more processors configured to obtain sensor data associated with a vehicle 112 and/or 116 operating in the environment 100. The sensor data can include a first portion associated with a first sensor and a second portion associated with a second sensor, or any other number of portions corresponding to the number of sensors implemented in a particular area or on the vehicle 112 and/or vehicle 116. In some examples, the sensors 106 can provide first sensor data associated with a first sensor at a first location or second sensor data associated with a second sensor at a second location, etc. The sensors 106 can be configured to generate raw data or preprocessed data and can transmit the data to computing devices associated with, for example, the vehicle 112 and/or vehicle 116 or analytics servers 104 for further processing. For example, the sensors 106 can stream images (also referred to as video data) to an edge device or an analytics server 104 for real-time analysis. In examples, an edge device can include components for visual input, preprocessing, local scene graph generation, an edge reasoning engine, a local knowledge cache, or a task complexity analyzer that can determine whether to perform local processing or offload processing to the analytics server 104.

Each of the vehicles 112 and 116 can include a device 107. The device 107 can include one or more processors, memory, or communication interfaces. The device 107 can be configured to obtain sensor data from sensors 106 mounted on the vehicle 112 or the vehicle 116. The device 107 can process the sensor data to determine features of the environment, such as objects 110 or agents 114. In examples, the device 107 can generate one or more scene graphs based on the determined features. The device 107 can then generate and/or update a knowledge graph based on the scene graph(s) and contextual information stored in memory of the device 107. In some examples, the device 107 can generate a control signal based on the knowledge graph. The device 107 can provide the control signal to one or more actuators or subsystems of the vehicle 112 or the vehicle 116 to adjust operation of the vehicle 112 or the vehicle 116, respectively. In some embodiments, the device 107 can perform one or more operations described as being performed by the analytics server 104. Additionally, or alternatively, the device 107 can communicate with the analytics server 104 via the network 102 to transmit sensor data (including image data, etc.), scene graphs, knowledge graphs, or control signals, or to receive updates or instructions.

In some examples, adjusting the operation of the vehicle 112 and/or the vehicle 116 can include modifying one or more operational parameters in response to conditions represented in the knowledge graph. In some embodiments, the analytics server 104 can query or traverse the knowledge graph to identify patterns of nodes, edges, and associated attributes that correspond to predefined operational conditions or rule-based triggers (e.g., speed-limit compliance, separation-distance enforcement, collision-avoidance thresholds, path-conflict detection), evaluate the confidence scores or temporal context associated with those elements, and select a control strategy whose parameters (e.g., magnitude of braking, steering angle change, acceleration ramp profile) are mapped to operations (e.g., the generation of control signals, warnings, etc., as described herein) that mitigate or resolve the detected condition. In some embodiments, the control signal can cause the vehicle 112 and/or the vehicle 116 to alter its speed, acceleration profile, steering angle, or braking force to maintain safe distances from detected objects or agents. The analytics server 104 may initiate lane changes or path re-routing to avoid known or predicted hazards, or to comply with operational constraints such as restricted zones or one-way travel paths. In this example, the nodes and/or edges of the knowledge graph can be traversed by the analytics server 104 to detect one or more conditions (e.g., based on one or more edges between one or more nodes indicating that an object is in proximity to another object and/or agent, that an object is not wearing protective equipment in a given scenario, etc.). In certain scenarios, the analytics server 104 can issue gradual deceleration commands to improve passenger comfort, or emergency braking commands if a collision risk is identified. Additional adjustments can include modifying the heading of the vehicle 112 and/or the vehicle 116 to follow an optimized route, pausing motion to yield to crossing pedestrians, or coordinating speed with other autonomous vehicles to facilitate safe merging. These actions can be executed autonomously, or in cooperation with remote operator oversight, based on the contextual understanding represented in the knowledge graph and the real-time conditions detected by the system.

In some examples, the analytics server 104 can detect a proximity violation by identifying, within a knowledge graph, that a node representing the vehicle 112 is connected by an edge labeled "proximity" to a node representing a pedestrian, where the edge attribute "distance" is less than a configured safe-distance threshold (e.g., 3 meters) and the "relative velocity" attribute indicates converging motion. In response, the analytics server 104 can map this condition to a pre-defined deceleration profile or to an adaptive braking maneuver learned from operational data. The analytics server 104 can then generate a control signal that is configured to cause a reduction in vehicle speed to a level ensuring compliance with the safe-distance threshold while maintaining passenger comfort. In another example, the analytics server 104 can identify a path conflict by traversing the knowledge graph to locate nodes representing the vehicle 116 and another agent (e.g., a forklift) that are each connected to path nodes (or temporal waypoints) showing intersecting trajectories within a time-to-intersection calculated based on velocity attributes associated with each. If the knowledge graph also encodes an operational constraint that prohibits simultaneous occupation of that intersection region, the analytics server 104 can select a control signal to cause the vehicle 116 to either hold position, re-plan the route to a secondary path with no conflict edges, or synchronize passage timing with the other agent to eliminate the conflict. In yet another example, the analytics server 104 can recognize an unsafe agent state by matching a subgraph pattern where an agent node is located inside a "restricted zone" node and carries an attribute indicating the absence of required safety equipment (e.g., "no high-visibility vest"), as determined from earlier visual analysis. In this case, the analytics server 104 can select a vehicle-halt control signal or limit the maximum allowable speed for all connected vehicle nodes within the same zone until the unsafe condition is resolved (e.g., the safety vest is put on), as reflected in an updated knowledge graph state. And in other examples, the analytics server 104 can detect dynamic hazard emergence by comparing successive versions of the knowledge graph and identifying new nodes or edges that represent unexpected obstacles (e.g., a fallen pallet on the road surface). If such an obstacle node is linked via a "blocking" relationship to an intended route of the vehicle 112 or the vehicle 116, the analytics server 104 can update the intended route of the vehicle 112 or the vehicle 116 by issuing a steering control signal to avoid the hazard or a complete stop command until a new safe route is computed and confirmed.

In some examples, in addition to or as an alternative to directly adjusting the operation of the vehicle 112 and/or the vehicle 116, the analytics server 104 can generate a report and/or an alert in response to determining, based on the knowledge graph, that a condition in the environment is unsafe or outside of permitted operational parameters. For instance, when the knowledge graph indicates that an agent is within a restricted zone, the vehicle 112 and/or the vehicle 116 can be operating too close to another object, or required safety equipment is absent, the analytics server 104 can generate an alert to be presented via a display device, audio output, haptic feedback system, or other human-machine interface within the vehicle or elsewhere in the environment. The analytics server 104 can prioritize alerts by severity, such that imminent collision risks trigger immediate, high-urgency notifications, while less critical violations generate advisory messages or warnings. Additionally, the analytics server 104 can compile these detected conditions into a report that includes contextual information such as the time, location, sensor readings, and relevant relationships from the knowledge graph, making the report available to fleet management systems, remote operators, or safety compliance personnel. This reporting and alerting functionality can allow for both real-time intervention and longer-term analysis of operational safety within the environment 100.

In embodiments, the warehouse 108 can include a physical facility that may be a distribution center, manufacturing floor, processing plant, etc., that is associated with the environment 100. The warehouse 108 can include a plurality of objects 110, vehicles (e.g., one or more of the vehicle 112 and/or vehicle 116), drones (e.g., individual drones, drone swarms, etc.), automated guided vehicles, or agents 114 (e.g., pedestrians or other dynamically moving individuals, objects, etc.) etc. The objects 110 can include inventory items, equipment, storage racks, or pallets etc. The vehicles 112 or 116 can include automated vehicles, forklifts, and/or other robotic systems. The agents 114 can include human operators, maintenance personnel, or supervisors etc. In some examples, the warehouse 108 can include structural elements such as walls, floors, or designated operational zones etc. The warehouse 108 can be configured to include sensors 106, such as cameras, environmental sensors, or any other sensor as described herein, that can be positioned on fixed infrastructure or mounted on the vehicle 112 and/or vehicle 116. In some examples, the warehouse 108 can include signage, safety barriers, or lighting fixtures etc., that can be relevant to the operation of the vehicle 112 and/or vehicle 116 or the movement of agents 114. In some examples, the arrangement of objects 110, vehicles 112 or 116, or agents 114 within the warehouse 108 can vary over time based on operational requirements or workflow changes.

In some examples, the environment 100 can include objects 110. The objects 110 can include physical items present within the environment 100, such as inventory, equipment, or infrastructure elements etc. For example, the objects 110 can include pallets, machinery, or storage racks within the warehouse 108. In some examples, the objects 110 can be detected, classified, or tracked as nodes within scene graphs generated by one or more processors. The scene graphs can represent the objects 110 as nodes, where each node can be associated with attributes such as color, size, or state (e.g., state, velocity, acceleration, etc.) etc. In some examples, the objects 110 can be identified based on sensor data received from sensors 106. The sensor data can include visual data, such as images or video, or other modalities, such as lidar or radar data, etc., as described herein. In response to receiving the sensor data, a scene graph generator implemented by one more devices (e.g., the computers of the vehicle 112 and/or vehicle 116 and/or the analytics server 104) can use computer vision or machine learning techniques to detect and classify the objects 110. For example, the scene graph generator can use object detection models to annotate bounding boxes or assign semantic labels to the objects 110. The scene graph generator can assign attributes to each object 110, such as a detected color, a measured size, or a determined operational state etc. In some examples, the scene graph generator can map spatial or action relationships between the objects 110 and other entities within the environment 100. This can occur at one or more points in time during a period of time.

In some embodiments, the environment 100 can include a vehicle 112 and/or vehicle 116, as well as other mobile platforms (e.g., that can refer to any mobile sensing platform, including road vehicles, aerial drones or drone swarms, automated guided warehouse robots, underwater inspection robots, etc.). The vehicle 112 may be an autonomous or semi-autonomous mobile platform that may operate within the environment 100. In some examples, the vehicle 112 may include sensors 106, one or more computing resources, or one or more communication systems. The onboard sensors of the vehicle 112 may include cameras, lidar sensors, radar sensors, or ultrasonic sensors etc. The computing resources of the vehicle 112 may include one or more processors or memory systems configured to execute perception, reasoning, or control operations. In examples, the communication systems of the vehicle 112 may include wireless or wired transceivers configured to exchange data with other components in the environment 100, such as an analytics server 104 or other vehicles.

In some examples, devices 107 of the vehicle 112 and/or vehicle 116 may receive sensor data from the onboard sensors or from sensors positioned in the environment 100. The devices 107 can process the sensor data to determine a set of features associated with the environment 100. The set of features can include one or more objects, agents, or features of the objects and/or agents. In response to determining the set of features, the devices 107 can generate a scene graph that represents poses or velocities of the one or more objects or the one or more agents relative to the environment 100. To generate the scene graph, the devices 107 can map each detected object or agent represented by the set of features to a corresponding node in a graph data structure, annotate each node with attributes such as spatial coordinates, orientation, velocity, classification label, and confidence score as further represented by the set of features, and establish edges between nodes by evaluating spatial, temporal, or semantic relationships (e.g., proximity, relative motion, containment, interaction) derived from the sensor data, thereby generating a structured, machine-interpretable representation of the environment at a given point in time. In response to generating the scene graph, the devices 107 can generate and/or update a knowledge graph based on the scene graph or stored contextual information. The knowledge graph can represent relationships involving (e.g., between) the one or more objects or the one or more agents in the environment 100. To generate the knowledge graph, the devices 107 can use the scene graph as an intermediate, time-specific depiction of the environment and transform it into a persistent, semantically enriched model by processing the scene graph(s) representing the environment from one or more points in time, merging entities across multiple scene graphs observed over a corresponding period of time, reconciling duplicate or overlapping nodes representing the same real-world object or agent, incorporating additional contextual data from stored maps, operational rules, or external knowledge bases, and inferring higher-level relationships (e.g., agent behavioral patterns, zone-based restrictions, predicted interaction outcomes) not explicitly present in the scene graph. In some examples, the devices 107 can update the knowledge graph based on the devices 107 comparing subsequently-generated scene graphs to a current knowledge graph, identify changes such as new entities, removed entities, or modified relationships, update node and edge attributes or confidence scores as represented by the knowledge graph, and preserve historical state information to maintain an evolving, queryable representation of the environment for downstream reasoning, planning, and control.

For example, the analytics server 104 can generate the knowledge graph to include node or node data structures that include information about the respective objects or the agents. The server 104 can generate edges or edge data structures between the respective nodes or node data structures that include information about the relationship between the respective objects represented by the nodes. For example, the edge data structures can include information, such as distances between the pairs of objects represented by the nodes connected by the edges.

In some examples, the devices 107 can generate control signals configured to adjust an operation of the vehicle 112 and/or the vehicle 116 based on one or more first attributes representing first states of the one or more objects or one or more second attributes representing second states of the one or more agents from the knowledge graph. The devices 107 can then provide the control signal to one or more actuators or subsystems of the vehicle 112 to cause the operation of the vehicle 112. For example, the control signal may cause the vehicle 112 and/or vehicle 116 to reduce speed, change direction, or stop in response to the determined states of objects or agents (e.g., being within a threshold distance or having an intersecting path with the vehicle 112 and/or the vehicle 116).

In some examples, devices 107 of the vehicle 112 may include (e.g., implement) components (e.g., as combinations of software and/or hardware) for visual input, preprocessing, local scene graph generation, an edge reasoning engine, a local knowledge cache, or a task complexity analyzer, as described below. For example, an edge reasoning engine may execute reasoning tasks based on locally generated scene graphs or a cached knowledge graph. In another example, the task complexity analyzer may determine whether to process a task locally or offload processing to an analytics server 104 or another remote resource. A local knowledge cache may store frequently used knowledge or context for rapid access by the edge reasoning engine. The combination of such components may provide that devices 107 of the vehicle 112 can perform real-time perception, reasoning, or actuation based on multi-modal sensor data and contextual information.

In some examples, the environment 100 can include agents 114. The agents 114 can include entities operating within the environment 100, such as autonomous systems or humans etc. For example, the agents 114 can include human workers, robots, or mobile platforms, etc. In a manufacturing plant context, the agents 114 can also include robotic manipulators, conveyor systems, or other automated machinery whose states and interactions can be modeled as agents within the scene graphs and/or knowledge graph as described herein. The agents 114 can be detected or tracked based on sensor data associated with the environment 100. In some examples, the agents 114 can be modeled as nodes within a scene graph or a knowledge graph (representing the state of the agents 114 over time), where the states or interactions of the agents 114 can influence subsequent processing or decision making. For example, the scene graph can represent poses and/or velocities of the agents 114 relative to the environment 100. In response to generating the scene graph, a knowledge graph can be generated based on the scene graph and stored contextual information, where the knowledge graph can include nodes and edges between (e.g., linking) the nodes to represent relationships involving the agents 114 or other objects in the environment 100. In some implementations, the agents 114 can be identified using multi-modal data fusion, behavior modeling, or semantic labeling. For example, a pedestrian can be detected using a model (e.g., a vision-based model such as a convolutional neural network, a vision transformer, etc.), and a trajectory of the pedestrian can be integrated into the scene graph. In some examples, the systems described herein can recognize actions or interactions between the agents 114 or other objects in sensor data, such as by analyzing spatial or temporal relationships.

In some examples, the environment 100 can include a vehicle 116. The vehicle 116 can be an autonomous or semi-autonomous mobile platform (e.g., that is the same as, or similar to, the vehicle 112) that operates within the environment 100. The vehicle 116 can include sensors 106 and one or more computing devices. For example, the vehicle 116 can obtain sensor data from the sensors 106 and the vehicle 116 can cause a device 107 to process the sensor data to generate a local scene graph representing a portion of the environment 100. In some examples, the vehicle 116 can then transmit the local scene graph via a network 102 to the analytics server 104. The network 102 can communicate the local scene graph to an analytics server 104 or to other vehicles (e.g., the vehicle 112) operating in the environment 100. In some examples, the vehicle 116 can receive local scene graphs generated by other vehicles or edge devices in the environment 100. The vehicle 116 can aggregate received local scene graphs with the local scene graph generated by the vehicle 116 and determine a global scene graph based on the aggregation. In examples, the vehicle 116 can provide the global scene graph to the analytics server 104, which can update a knowledge graph based on the global scene graph. In some examples, the vehicle 116 can operate independently or in collaboration with the vehicle 112 or other agents 114 in the environment 100. For example, the vehicle 116 can share local scene graphs with a central aggregator to contribute to global scene graph construction or can participate in distributed reasoning tasks by exchanging information over the network 102.

In some embodiments, the environment 100 can include a pedestrian 118. The pedestrian 118 can be a human agent present within the environment 100, whose actions or states are relevant for safety analysis or operational analysis. For example, the pedestrian 118 can include a worker walking within the warehouse 108 or on a factory floor etc. In some examples, the pedestrian 118 can be detected or tracked as an agent within a scene graph generated by an analytics server 104. The proximity or interactions of the pedestrian 118 with other entities in the environment 100 can be determined based on sensor data received from sensors 106. The proximity or interactions can influence vehicle control or safety protocols within the environment 100.

In some examples, the pedestrian 118 can be identified using vision-based detection algorithms (including one or more models as described herein). The location or movement of the pedestrian 118 can be incorporated into real-time reasoning or control decisions by one or more processors of one or more devices as described herein. For example, the pedestrian 118 can be identified based on the output of a vision model that can detect human agents in video data. Information about the pedestrian 118 can then be encoded into a knowledge graph maintained as described herein, such as the pose, location, velocity, etc., of the pedestrian 118 in a node representing or corresponding to the pedestrian 118. In response to the analytics server 104 and/or the devices 107 traversing the knowledge graph and detecting the pedestrian 118 (e.g., a node of the pedestrian) within a predetermined distance of a vehicle 112 or a vehicle 116 (e.g., based on the edge between the node of the pedestrian 118 and node of the vehicle 112 or the vehicle 116 containing a distance measurement below a threshold), a control signal can be generated by the analytics server and/or the devices 107 to cause the vehicle 112 or the vehicle 116 to slow down or stop. In some examples, the control signal can be generated based on one or more first attributes representing first states of one or more objects or one or more second attributes representing second states of one or more agents, such as the pedestrian 118, from a knowledge graph. For example, the vehicle 112 or the vehicle 116 can be operated below a threshold speed when within a predetermined distance from the pedestrian 118 or from another agent 114, etc. In some examples, the pedestrian 118 can be detected as not wearing appropriate clothing such as a hard hat, a high-visibility vest, or other required personal protective equipment etc. The absence of such clothing can be determined by one or more processors based on sensor data received from sensors 106 or based on analysis performed by a vision model. In response, an attribute indicating the absence of required personal protective equipment can be annotated to the pedestrian 118 within a scene graph or a knowledge graph generated by one or more processors. The annotated attribute can be used as a factor in subsequent reasoning or control decisions related to the operation of the vehicle 112 or the vehicle 116.

In a non-limiting example, in the context of monitoring operation of a large automated warehouse, a forklift-style factory robot can be configured to navigate aisles to deliver pallets between storage racks and conveyor belts. A device 107 onboard the robot can be configured to obtain sensor data from two sources: a front-facing LiDAR scanner (first sensor) that captures 3D point clouds of shelving units, other robots, and obstacles, and a high-resolution stereo camera (second sensor) that captures visual details and color cues. This first portion of LiDAR data and second portion of camera data form the initial multi-modal input collected at a first point in time. As the robot moves forward, the device 107 can obtain second sensor data, which includes a new LiDAR sweep (third portion) and a fresh camera image set (fourth portion) generated at a second point in time. The device 107 updates at least one relationship in its knowledge graph from this new data, for example changing the status of a human worker node from "stationary" to "moving toward robot path." If the initial first control signal called for forward motion, the updated relationships may trigger generation of a second control signal that alters the planned movement.

The device 107 can be configured to process the most recent sensor data to determine a set of environmental features. Using LiDAR point clouds, the device 107 can be configured to generate depth maps that indicate object candidates based on geometric continuity. The device 107 can also process the stereo camera imagery using an object detection model, etc., that labels entities such as pallets, shelving, and forklifts. Additionally, or alternatively, agent detection models can be configured to identify humans, estimate poses, and predict motion vectors. Sensor fusion algorithms can then be implemented by the device 107 to match LiDAR-identified shapes to camera-detected classifications, assigning attributes such as location, orientation, type label, and velocity to each object and agent.

From this fused feature set, the device 107 can generate a scene graph. Each node in the scene graph can represent a detected object or agent, and each node can be annotated with attributes such as 3D coordinates in the warehouse frame, estimated pose, velocity, and detection confidence score. Edges in the scene graph can represent spatial or semantic relationships derived from the sensor fusion results and configured rules. For example, proximity edges may be created when two nodes are within a predetermined distance, motion-path-intersection edges when predicted trajectories overlap, containment edges when an object is situated at a known station, and interaction edges when an agent is actively moving an object. This can allow the device 107 to generate a current-time structured digital representation of the environment.

The device 107 can then generate a knowledge graph from one or more scene graphs and stored contextual information. When doing so, the device 107 can merge nodes from consecutive scene graphs and/or prior versions of the knowledge graph that represent the same physical entity, using confidence thresholds and spatial-temporal consistency checks. The device 107 can further generate or update the knowledge graph by enriching the represented relationships with domain and historical data such as the known restricted zones in the warehouse, traffic flow rules, and typical agent behavior patterns. For example, a "worker node" might be linked to a "restricted zone node" if camera data and map layers indicate the worker is in a no-go area. The knowledge graph preserves historical states for trend analysis, incorporates safety constraints, and resolves observation conflicts by choosing data from the most reliable source or fusing multiple inputs. Once formed, the knowledge graph can provide a persistent, queryable model that supports strategic planning, hazard detection, and policy enforcement.

To traverse the knowledge graph, the device 107 can follow edges between connected nodes, examine the associated attributes and metadata for those edges, and evaluate them against configured safety and operational rules to detect situations such as a path-intersection relationship whose distance and velocity attributes predict a collision. Using this process, the device 107 can identify that, for example, a worker node is approaching within 2 meters of the robot's path, violating the configured minimum separation distance. A planning engine implemented by the device 107 can determine to adjust movement, selecting a new operational profile that reduces speed from 1.0 m/s to 0.3 m/s and generates a second path along a perpendicular aisle that avoids the worker. The updated control signal can reflect both the speed adjustment and the rerouting instruction. The device 107 can then transmit this control signal to the drive subsystem of the robot, resulting in a smooth deceleration and safe navigation to the drop-off point while avoiding hazards and complying with warehouse operational policies.

In another non-limiting example in the context of monitoring operation of a busy distribution warehouse, a forklift-style autonomous factory robot can be equipped with a device 107 that performs perception and planning operations. The device 107 can first obtain first sensor data from a LiDAR unit (first sensor) mounted near the front mast and second sensor data from an overhead stereo camera (second sensor) mounted on warehouse infrastructure, positioned within 3 meters of the robot's location. The first sensor data can capture 3D point cloud geometry of nearby shelving, pallets, and other robots, while the second sensor data can provide overhead imagery showing the aisle layout and moving agents from above. Both sensors can be in fixed relation to either the vehicle or the environment. The LiDAR output can be treated as a first sensor modality and the stereo camera imagery as a second sensor modality. The device 107 can determine a correspondence between the two data sets by aligning shared features, such as the position of a known pallet stack, and aggregates attributes from both the first local scene graph and the second local scene graph into a global scene graph. The device 107 can also detect and resolve conflicts, for example, when the LiDAR data shows a forklift in one location but the overhead camera indicates it has already moved, favoring the time-stamped, higher-confidence observation. Using stored calibration parameters, the device 107 can compute the relative pose transformation between the sensors, transforming their outputs into a common coordinate frame before continuing.

The device 107 can be configured to generate a first local scene graph from the LiDAR data, representing the portion of the environment visible from the robot's perspective, including nearby shelving, pallets, and a moving forklift. The device 107 can also generate a second local scene graph from the overhead stereo camera data, representing the top-down view of the same aisle and adjacent cross-aisle, which includes both the moving forklift detected by the LiDAR and a human worker walking behind a stack of pallets. In examples, the device 107 (and/or an analytics server 104) can generate a global scene graph by merging these two local graphs into a single, more complete spatial representation.

From this merged representation, the device 107 can generate a knowledge graph that creates persistent entities for the detected objects and agents, linking them with relationships such as "approaching from left aisle," "carrying object," or "blocking path to drop-off." Each node can be assigned semantic labels using a trained classification model, for example identifying a node as a "forklift" or "human worker." The device 107 can then determine overlaps between nodes from the first and second local scene graphs, such as recognizing that the forklift in the LiDAR view and the forklift in the overhead camera image are the same entity. The device 107 can merge these nodes when their positions, velocities, and semantic labels match across various scene graphs or iterations of the knowledge graph when both carry confidence scores exceeding a set threshold, ensuring that uncertain detections are not merged in error. This can allow the device 107 to generate and maintain a knowledge graph that represents the composite, semantically rich model of the environment. By traversing the graph, the device 107 can, for instance, follow edges between the robot node and a human worker node connected by a "path intersection" relationship, with corresponding attribute data indicating that their predicted movement trajectories converge in 2.5 seconds. This can cause the device 107 to trigger the determination that a condition exists which could violate a warehouse safety rule requiring a minimum 2-meter separation between robots and humans. In such examples, the device 107 can then generate a control signal to adjust the robot's operation. This control signal can be configured to cause the drive system to slow the robot from 1.0 m/s to 0.4 m/s and reroute it through a nearby parallel aisle, avoiding the predicted path intersection. The device 107 can then provide (e.g., transmit) the control signal to the robot's motion controller, ensuring the vehicle slows, follows the alternate path, and continues toward its delivery location while maintaining compliance with safety regulations.

In another non-limiting example, a large automated warehouse, a forklift-style autonomous factory robot can be equipped with a device 107 that can obtain first sensor data at a first point in time while the robot navigates toward a pallet pickup station. The first portion of this data can come from a LiDAR unit mounted on the robot, capturing 3D point clouds of the nearby shelving, pallets, and other agents in the aisle. The second portion can come from a forward-facing stereo camera mounted on the robot, capturing RGB images for object classification and detection of visual markers. The device 107 can process the LiDAR data and camera data separately, generating a first scene graph for the LiDAR-based entities and a second scene graph for the camera-based entities. The device 107 can determine correspondences between the scene graphs by matching object IDs, positions, and shapes for items detected by both sensors, and can aggregate their attributes into a global scene graph. This global scene graph can align all detected entities into a single coordinate frame by using stored calibration parameters to compute and apply the relative pose transformation between the LiDAR and the camera.

From the resulting global scene graph, the device 107 can generate a knowledge graph representing the relationships among the robot, other robots, pallets, racks, and human workers in the same aisle at that first point in time. For example, the knowledge graph can link the robot node to a human worker node via a "path-intersection" edge, associate the worker with a "carrying load" attribute, and record the positions of stationary pallets blocking an adjacent cross-aisle. This persistent graph structure can allow the device 107 to execute operations and perform reasoning over both spatial and semantic relationships in the environment, supporting planning decisions that can extend beyond immediate sensor detections.

As the robot continues movement toward the pickup station, the device 107 can obtain second sensor data at a second point in time. This new LiDAR and camera data can indicate that the worker is moving closer to the robot's intended path and that another autonomous forklift has entered the cross-aisle from the opposite side. By comparing the updated scene graphs with the knowledge graph from the first point in time, the device 107 can detect relationship changes such as reduced distance and converging velocity vectors. The knowledge graph can be updated accordingly, including new timestamps and state changes for the worker and the other forklift as represented by their motion through the environment over time.

The device 107 can track entity movement through the updated knowledge graph and can determine that the robot's current planned path will violate operational requirements, for example by putting the robot within the warehouse's 2-meter minimum separation from a human worker and by creating an overlap with the inbound forklift's path. In response, the device 107 can generate a control signal that instructs the robot to slow from 1.2 m/s to 0.4 m/s and follow an alternate path that routes behind stationary shelving to the same destination. This control signal can then be sent to the robot's drive system to enable compliant and collision-free navigation while maintaining operational throughput.

For ease of description, certain examples relate to the operation of autonomous factory robots and corresponding execution of operations by a device 107 installed thereon. However, it will be understood that any suitable device (e.g., a factory robot, an automated vehicle, a fixed environment monitoring system, a drone or drone swarm, etc.) can be used to implement the techniques described herein.

Figure 2:
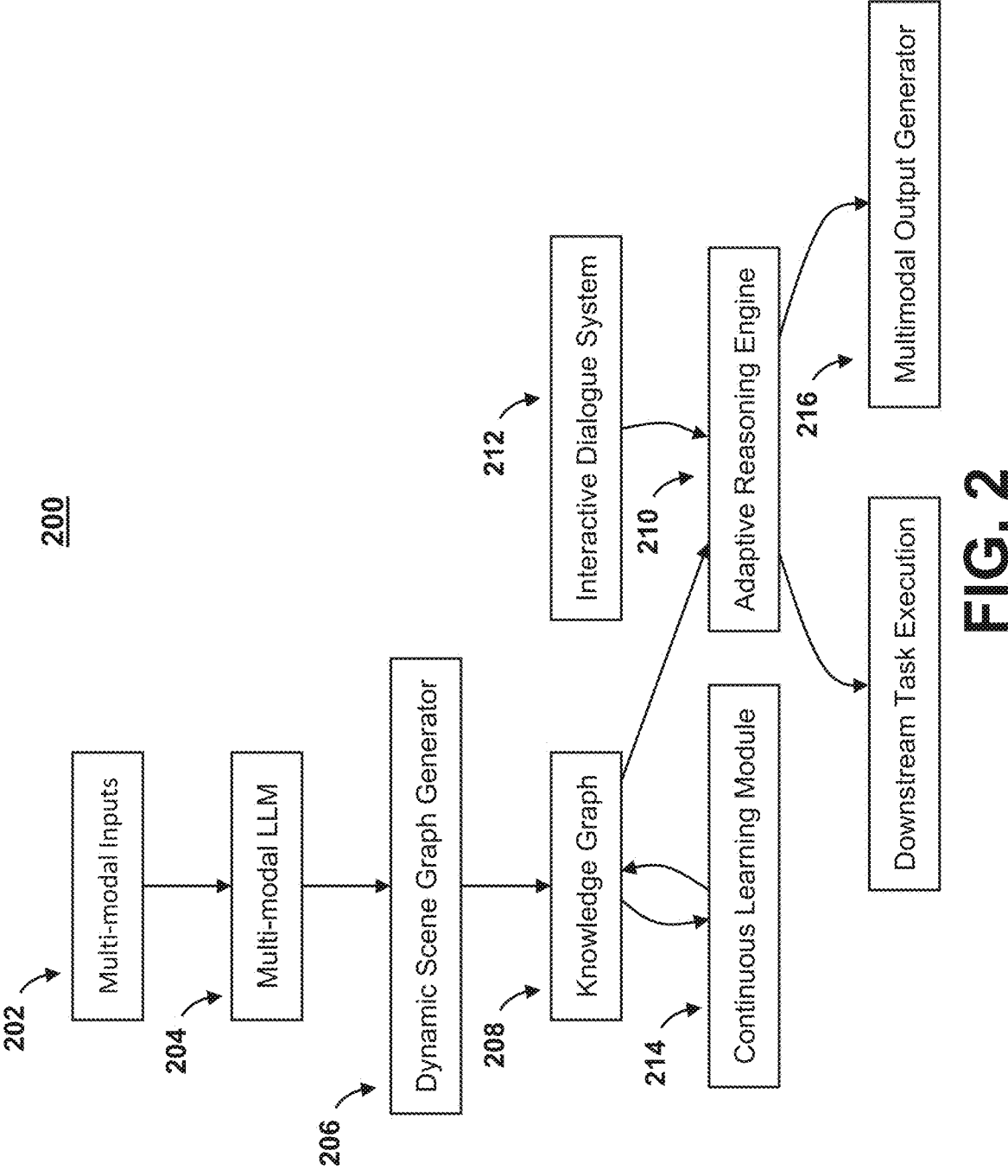
FIG. 2 is a block diagram illustrating a process for generating a dynamic scene graph from multi-modal inputs and integrating the dynamic scene graph as an update to a knowledge graph, in accordance with one or more embodiments.

Referring now to FIG. 2, illustrated is a block diagram of a process 200 for generating a dynamic scene graph from multi-modal inputs and integrating the dynamic scene graph as an update to a knowledge graph, according to one or more embodiments. In embodiments, the process 200 can involve the implementation of a multi-modal input 202, a multi-modal large language model 204, a dynamic scene graph generator 206, a knowledge graph 208, an adaptive reasoning engine 210, an interactive dialogue system 212, a continuous learning system 214, or a multimodal output generator 216 by one or more devices as described herein. The process 200 can be implemented by any suitable device of FIG. 1, such as the devices 107 and/or the analytics server 104. For ease of description, certain operations described as performed with respect to FIG. 2 are described as performed by an analytics server that is the same as, or similar to, the analytics server 104.

In some embodiments, the process 200 can include an analytics server obtaining a multi-modal input 202. The multi-modal input 202 can be obtained from any combination of data sources, such as images, videos, text queries, contextual information, few-shot examples, or multi-modal prompts etc., generated by one or more sensors (e.g., that are the same as, or similar to, the sensors 106 of FIG. 1) and/or devices (such as a client device or other computing device that has established a communication connection with the analytics server). In some examples, the multi-modal input 202 can include a stream of video from a factory or warehouse floor, text descriptions of safety procedures provided as input by an individual monitoring the environment at a client device, or annotated images for training etc. The multi-modal input 202 can allow the analytics server to perform scene understanding or reasoning based on the received data. In some examples described herein, the multi-modal input 202 can include sensor data associated with a vehicle operating in an environment, where the sensor data includes include a first portion associated with a first sensor or a second portion associated with a second sensor, etc. For example, the multi-modal input 202 can include data from cameras installed on a vehicle or in the environment in which the vehicle is operating capturing video, microphones capturing audio, or user devices submitting text prompts etc.

In some embodiments, the process 200 can include execution of a multi-modal large language model 204. In some examples, the multi-modal large language model 204 can be configured to receive visual input such as images or videos, and/or text input such as queries, contextual information, or prompts from the devices and/or data sources described herein. The multi-modal large language model 204 can then process the input using one or more neural network architectures as described herein that are configured to encode information from different modalities. For example, the multi-modal large language model 204 can use transformer-based models trained on both text and images. As a result of execution of the multi-modal large language model 204, a set of features associated with an environment can be determined based on the sensor data, where the set of features can include and/or otherwise indicate one or more objects or one or more agents, along with attributes of the one or more objects and/or agents and their relationship to the one or more other objects or agents in the environment. In response to receiving multi-modal input, the multi-modal large language model 204 can generate and provide an output to cause execution of the dynamic scene graph generator 206 and generate unified representations of the input for downstream processing. In some examples, the multi-modal large language model 204 can fuse information from visual and text modalities such that the resulting representation encodes semantic meaning from both sources. The multi-modal large language model 204 can be configured to process few-shot examples, multi-modal prompts, or contextual queries etc., to create unified representations for use by other components of the process 200.

Various model architectures can be used in the implementation of the multi-modal large language model 204 as part of process 200. In some examples, the multi-modal large language model 204 can use transformer-based neural network architectures that are designed to handle both text and visual data within a unified structure. The multi-modal large language model 204 can include attention mechanisms to align and integrate information from different modalities, such as images and text or video and queries. In certain examples, the multi-modal large language model 204 can also combine convolutional neural networks for extracting features from visual data with transformer or recurrent neural networks for processing text, integrating these modalities through dedicated fusion layers to create a shared representation of the environment.

The multi-modal large language model 204 can be configured to receive as input a range of data types, such as images, video, text queries, prompts, and contextual information. For example, the multi-modal large language model 204 can be configured to receive an image or sequence of images together with a corresponding text prompt or contextual information to process both streams in parallel (e.g., at one or more time steps that can be ordered in a sequence). The output from the multi-modal large language model 204 can be a unified representation that captures semantic relationships and relevant features present in the combined input, allowing for downstream processing by other components such as a dynamic scene graph generator. This unified output can include embeddings that jointly represent objects, agents, or scene context and can be used for further analytical or decision-making processes as described herein.

Training the multi-modal large language model 204 can involve providing inputs (e.g., images, frames from a video stream, text representing corresponding prompts, etc.) along with target outputs (e.g., ground-truth annotations, text strings, etc.) indicating correct associations or classifications. When the multi-modal large language model 204 receives these training inputs, it can be configured to process the training inputs through its architecture to generate outputs (also referred to as predicted outputs), which are compared with the target outputs using a suitable loss function. Based on the result of this comparison, the weights of the multi-modal large language model 204 can be iteratively updated by backpropagation, etc., where gradients are computed and distributed to optimize future model performance. Over the course of iterative training, the multi-modal large language model 204 can become proficient at generating accurate unified representations from diverse multi-modal inputs for use in downstream tasks.

In some embodiments, the process 200 can include a dynamic scene graph generator 206 (e.g., a software or hardware component configured to receive multi-modal input, such as images, video, and/or text, and generate a structured graphical representation of a visual scene in which nodes represent objects or agents and edges represent spatial or functional relationships among those entities). The dynamic scene graph generator 206 can receive outputs from a multi-modal large language model 204 and can generate structured representations of visual scenes (referred to as scene graphs). In some examples, the dynamic scene graph generator 206 can receive multi-modal inputs such as images, videos, or text prompts etc., and/or embeddings representing these multi-modal inputs generated by the multi-modal large language model 204 and can process such inputs to recognize and label objects, assign attributes, or map spatial or action relationships of the environment. The dynamic scene graph generator 206 can generate an output representing a scene graph having a plurality of nodes in which each node represents discrete objects or agents and edges represent spatial or functional relationships, such as proximity, containment, or interaction etc. In some examples, the dynamic scene graph generator 206 can use object detection models to identify objects, assign semantic or physical attributes, or determine poses and velocities of objects and/or agents relative to the environment. In examples, the dynamic scene graph generator 206 can process relationship mapping prompts or contextual information to determine relationships among detected objects and/or agents.

In some examples, the dynamic scene graph generator 206 can integrate domain-specific information or external knowledge into the scene graph. As an example, the dynamic scene graph generator 206 can use a retrieval-augmented generation system to query external knowledge graphs or unstructured documents and can incorporate retrieved information into the scene graph. In one example, the dynamic scene graph generator 206 can use retrieval-augmented generation to enrich object or relationship labels with domain-specific terminology or external facts. The dynamic scene graph generator 206 can then process user or task-specific preferences to fine-tune the granularity of entity recognition, the prioritization of relationship types, or the structure of the scene graph. In some examples, the dynamic scene graph generator 206 can include contextual metadata to nodes or edges in the scene graph, such as source information, timestamps, or confidence scores etc.

The dynamic scene graph generator 206 can be implemented using a variety of model architectures tailored for processing multi-modal data. In some examples, transformer-based neural networks can be employed, where attention mechanisms enable the model to align and integrate visual features from sources such as images or video with linguistic or contextual data. Other examples can include convolutional neural networks for extracting spatial features from visual input, which can then be combined with recurrent neural networks or language models to incorporate temporal or sequential context from text or other data streams. In some examples, the dynamic scene graph generator 206 can also include modality-fusion layers, configured to combine embeddings or feature maps from multiple sensor modalities into a shared representation suitable for representing a structured scene understanding in a scene graph. In certain examples, the dynamic scene graph generator 206 can also incorporate retrieval-augmented generation components that leverage external databases or knowledge graphs, thereby enriching the scene graph with domain-specific information.

The dynamic scene graph generator 206 can be configured to receive a variety of multi-modal sources that reflect the state of an environment. Inputs can include images, frames from video streams, sensor readouts, and supplemental textual information such as prompts or contextual metadata. The dynamic scene graph generator 206 can process these inputs and encoded the inputs to generate a unified representation that captures relevant objects, agents, and contextual cues present in the environment at a point in time as a scene graph. The scene graph can include nodes that correspond to detected objects and agents, and edges that encode semantic or spatial relationships between these nodes. The structure of the output graph can further include node attributes, such as object classes, states, or visual features, and edge attributes, such as relationship types, proximity values, or interaction descriptors. This scene graph can be formatted to support downstream reasoning, planning, or control processes in automated vehicle or robotic systems.

The dynamic scene graph generator 206 can be trained by providing paired sets of multi-modal inputs and ground-truth scene graph annotations. During training, the inputs such as annotated images and corresponding textual descriptions are fed through the model to produce predicted scene graphs. The predicted outputs can then be compared to the target scene graph annotations using a suitable loss function, such as a graph-matching or semantic segmentation loss. Based on the computed loss, the weights of the dynamic scene graph generator 206 are updated via backpropagation, where gradients are calculated and applied to optimize the correspondence between the predicted and ground-truth scene graphs in subsequent training iterations. Over time, the dynamic scene graph generator 206 can be refined as additional training data is obtained and used to train the dynamic scene graph generator 206, thereby improving the accuracy and reliability of the dynamic scene graph generator 206 when processing new, unseen multi-modal data streams.

In some embodiments, the process 200 can include generation of a knowledge graph 208 (e.g., a structured data model that represents entities such as objects and agents, along with relationships and contextual information derived from scene graphs and external sources, for use in reasoning, planning, or control processes). The knowledge graph 208 can include a structured representation of entities, relationships, or contextual information derived from scene graphs or external sources across one or more time steps. In some embodiments, the knowledge graph 208 can include a graph database that can store information such as identified attributes of equipment, safety procedures, or historical incidents etc., that are associated with the environment. In some examples, the knowledge graph 208 can store or organize integrated information that can be used in reasoning, planning, or control of vehicles (e.g., that are the same as, or similar to, the vehicle 112 and/or the vehicle 116), as described herein. In examples, the knowledge graph 208 can be updated by merging new scene graph data (e.g., from subsequent time steps), assigning confidence scores to aspects represented by the scene graph data, maintaining versioning, or resolving conflicts. In some examples, the knowledge graph 208 can use consistency checking or hierarchical integration to update the knowledge graph 208. The knowledge graph 208 can be verified as new information is obtained by comparing changes to the set of nodes (e.g., updates, additions, subtractions) against existing knowledge for logical consistency. For example, aspects of the knowledge graph 208 can be compared to aspects of the new scene graphs and where mismatches are detected or proportionally lower confidence levels corresponding to the aspects are present in the new scene graph or knowledge graph 208, the knowledge graph 208 can be updated (e.g., by including the attributes associated with the proportionally higher confidence levels).

The analytics server can implement a knowledge graph model using a variety of model architectures that are configured to capture and integrate complex relational information from structured scene graph data. Graph neural networks (GNNs) can be used to process the graph-structured input, where node and edge embeddings can be iteratively refined through message passing networks to capture semantic and contextual relationships. In some implementations, transformer-based architectures can be adapted for graph data by using self-attention mechanisms to model dependencies across distant nodes or relationships identified within the input scene graphs. In addition, hybrid models can combine neural message passing techniques with rule-based reasoning modules or memory-augmented networks, which can allow the knowledge graph model to merge input scene graph information with stored knowledge and maintain consistency across dynamic knowledge representations.

The knowledge graph model can receive as input one or more scene graphs, such as a single scene graph representing a current view of the environment or a set of local scene graphs that reflect different portions of the environment as detected by distinct sensors or edge devices. The knowledge graph model can process these scene graphs to extract objects, agents, relationship annotations, and any associated metadata including labels, confidence scores, or temporal information. The output from the knowledge graph model can be a knowledge graph structured as a data representation in which nodes can represent entities such as objects or agents and edges can denote contextual or semantic relationships, operational attributes, or inferred environmental states. The knowledge graph can further contain attributes at the node/edge or relationship level, which can enable downstream querying, planning, or automated reasoning for vehicle or robotic control applications. For example, the knowledge graph can include nodes with edges connecting the nodes, where the edges are further associated with metadata, etc., to indicate one or more aspects regarding the relationships between the objects and/or agents associated with the nodes (e.g., a distance between the two objects and/or agents, an indication of whether the two agents are within a distance from one another (e.g., are within proximity of one another), an agent is classified as wearing protective equipment, etc.).

The knowledge graph model can be trained by providing scene graphs or collections of local scene graphs together with ground-truth knowledge graph annotations that specify the desired output structure and content. During this training process, the input scene graphs can be processed by the knowledge graph model to generate a predicted knowledge graph, and this output can be compared to the target knowledge graph using a suitable loss function such as a structural or semantic alignment loss. The weights of the model can then be updated through backpropagation, where gradients can be calculated and used to adjust parameters to reduce the loss and improve alignment between the generated and target knowledge graphs over multiple training iterations. Through repeated training on annotated examples, the knowledge graph model can learn to synthesize, refine, and aggregate structured information from scene graph inputs with increasing precision and reliability.

In some embodiments, the adaptive reasoning engine 210 can be configured to receive the knowledge graph data associated with the knowledge graph 208. The adaptive reasoning engine 210 can then process the knowledge graph data to perform reasoning tasks that can include few-shot learning, zero-shot execution, chain-of-thought reasoning, etc. For example, the adaptive reasoning engine 210 can receive a query (represented in any modality, such as an plain text, images, frames from a video stream, etc.) from the interactive dialogue system 212, determine relevant nodes or relationships from the knowledge graph 208 based on the query, and generate an output based on traversing the knowledge graph 208. The output generated by the adaptive reasoning engine 210 can include a response to the query, such as a text explanation, a set of reasoning steps, an identified relationship between objects and/or agents in the environment, or a recommended action based on a state of the knowledge graph 208. In some examples, the adaptive reasoning engine 210 can generate output in one or more modalities, including text, annotated images, generated scenes, interactive visualizations etc. The adaptive reasoning engine 210 can select a reasoning strategy based on task requirements, such as using chain-of-thought prompts to decompose a reasoning task into multiple steps or using few-shot examples to adapt to new queries.

The adaptive reasoning engine 210 can be implemented using various neural network architectures designed for processing natural language prompts and knowledge graphs and generating context-aware responses. In some examples, large language models (similar to the multi-modal models described herein) based on transformer architectures can be used to process complex sentence structures and retain contextual information across both short and long prompts. These architectures can implement self-attention layers that allow the reasoning engine to dynamically focus on relevant portions of the input query when generating output. In certain examples, the adaptive reasoning engine 210 can incorporate retrieval-augmented generation techniques that allow the adaptive reasoning engine 210 to dynamically reference external knowledge bases or knowledge graphs in response to user prompts, enriching responses with up-to-date information. Hybrid models can also combine rule-based systems with deep learning modules to support both structured and conversational task domains.

The adaptive reasoning engine 210 can receive as input prompts in the form of plain text queries, instructions, or contextual questions. The prompts can be free-form and can include operational queries, requests for explanations, or context-driven user instructions. The adaptive reasoning engine 210 can process these inputs to extract semantic meaning, intent, and any contextual dependencies required for a relevant response. The primary output from the adaptive reasoning engine 210 can be a plain text response that directly answers the query, explains a detected relationship, or provides recommended actions based on the internal knowledge graph or contextual data available at inference time. Outputs can be formatted as standalone statements, step-by-step reasoning explanations, or actionable recommendations, depending on the user prompt and task requirements.

Training the adaptive reasoning engine 210 can involve exposing the underlying model architecture of the adaptive reasoning engine 210 to large datasets containing pairs of input prompts and target text-based responses. During the training process, each input prompt can be processed by the adaptive reasoning engine 210 to generate a predicted output, which can then be compared to the desired target response using a language modeling loss function, such as cross-entropy or sequence-to-sequence loss. The adaptive reasoning engine 210 model weights can be updated through backpropagation, where gradients are computed to minimize discrepancies between predicted and target responses. Over many iterations, the adaptive reasoning engine 210 can learn to produce contextually relevant and coherent text outputs that align with the intended meaning and requirements of a wide range of plain text prompts.

In some examples, the adaptive reasoning engine 210 can be configured to (e.g., prompted to) quantify uncertainty associated with reasoning outcomes. For example, the adaptive reasoning engine 210 can assign a confidence score to each inference or output generated by the adaptive reasoning engine 210 during the reasoning process. In an example, the adaptive reasoning engine 210 can evaluate the reliability of relationships in the knowledge graph 208 or the completeness of the scene graph data from the dynamic scene graph generator 206. In some examples, the adaptive reasoning engine 210 can then generate a control signal based on one or more first attributes representing first states of one or more objects and/or agents or one or more second attributes representing second states of one or more objects and/or agents represented by the knowledge graph 208. The control signal can be provided to adjust the operation of a vehicle based on the reasoning outcome. Additionally, or alternatively, the adaptive reasoning engine 210 can determine a response to a query based on the reliability of the relationships in the knowledge graph 208. For example, if a query requests information about a number of users in proximity to a vehicle in the environment that are not wearing appropriate protective equipment, the adaptive reasoning engine 210 can analyze the knowledge graph 208 to determine whether the aspects indicating the users in proximity to the vehicle are or are not wearing the equipment. In this example, the adaptive reasoning engine 210 can compare the reliability of the relationships (e.g., a value representing the reliability, etc.) to a predetermined threshold and determine whether to provide an indication that users are or are not wearing the protective equipment.

In some examples, the adaptive reasoning engine 210 can integrate external knowledge into the reasoning process. Similar to as described above, the adaptive reasoning engine 210 can implement retrieval-augmented generation techniques to formulate context-aware queries, retrieve domain-specific information from external sources, and incorporate the retrieved information into the reasoning process. For example, the adaptive reasoning engine 210 can supplement the knowledge graph 208 with facts or relationships obtained from external knowledge bases or unstructured documents (e.g., indicating that certain protective equipment should be present when agents are present, etc.). The adaptive reasoning engine 210 can be tuned based on user preferences or task-specific requirements, such as by adjusting the reasoning strategy or the integration of external knowledge based on feedback or contextual information.

As described above, the interactive dialogue system 212 can receive input from a user during the reasoning process. For example, the interactive dialogue system 212 can receive the input at a client device that is remote from an analytics server, or at a device associated with automated operation of a vehicle (e.g., that is the same as, or similar to, the vehicle 112 and/or vehicle 116). The client device can be controlled by a user monitoring the movement of objects and/or agents in the environment 100. In some examples, the interactive dialogue system 212 can determine whether the input includes a query, a clarification request, or feedback related to the reasoning process. For example, in response to receiving and detecting a query, the interactive dialogue system 212 can generate a context-aware question to the user to resolve ambiguities or missing information in the initial input. The interactive dialogue system 212 can generate an explanation in response to a user request for additional detail about a reasoning step. In some examples, the interactive dialogue system 212 can receive feedback from the user, such as a correction or a preference, and can incorporate the feedback to refine the reasoning process. For example, the interactive dialogue system 212 can generate clarification prompts based on detected uncertainties in the user input or can adjust the query parameters in response to user responses. The interactive dialogue system 212 can maintain a record of the dialogue history, such that subsequent reasoning steps can reference prior user interactions. In examples, the interactive dialogue system 212 can generate outputs responsive to the query based on outputs generated by the adaptive reasoning engine 210 that are based on the inputs to the interactive dialogue system 212.

In some examples, the interactive dialogue system 212 can receive a query describing a scenario or set of operational criteria for vehicles in the environment 100. The interactive dialogue system 212 can then process the query and generate output that specifies one or more conditions or thresholds relevant to the operation of the vehicles (e.g., that users are or are not within a threshold distance from the vehicles operating in the environment). The output of the interactive dialogue system 212 can be compared to the specified criteria to relationships represented in the knowledge graph 208. In response to determining that the relationships in the knowledge graph 208 satisfy the criteria described by the query, the analytics server can generate a control signal configured to adjust the operation of the vehicles and/or generate warnings or alerts at devices in the environment (e.g., displays, speakers, etc.). For example, the interactive dialogue system 212 can receive a query describing a scenario in which a vehicle is operating within a predetermined distance of an agent such as another vehicle or a pedestrian without required personal protective equipment, identifying markers, etc. In response to the knowledge graph 208 indicating that such a relationship exists, the analytics server can generate a control signal to reduce the speed of the vehicles or to stop the vehicles in the environment. In other examples, the interactive dialogue system 212 can receive a query specifying that a vehicle should not operate along a path that overlaps with a path assigned to an agent. In response to the analytics server traversing the knowledge graph 208 and determining that the relationships represented by the nodes and edges of the knowledge graph 208 indicates a vehicle and an agent are operating along overlapping paths, a control signal can be generated to redirect the vehicle to operate along a different path. As a result, the interactive dialogue system 212 can provide output that is used to dynamically update control signals for vehicles in the environment based on real-time analysis of criteria and relationships represented in the knowledge graph 208.

In some examples, the process 200 can include an analytics server implementing a continuous learning system 214. The continuous learning system 214 can receive updates from processed scene graphs generated by the dynamic scene graph generator 206 and can incrementally expand the knowledge graph 208 based on such updates. The continuous learning system 214 can recognize recurring patterns across multiple scene graphs and generate higher-level abstractions by identifying such patterns. In some examples, the continuous learning system 214 can dynamically adjust relationship weights in the knowledge graph based on frequency or relevance of observed relationships. The continuous learning system 214 can detect concept drift by comparing recent scene graph information with information represented by the knowledge graph 208 at a current point in time or one or more prior points in time. In response to detecting concept drift, the continuous learning system 214 can update the knowledge representation to reflect new patterns or relationships. In some examples, the continuous learning system 214 can integrate active learning techniques, such as querying for additional data or feedback, to address gaps in the knowledge graph 208. In some examples, the continuous learning system 214 can update the structure of the knowledge graph 208 as new data (including new patterns or changes to identified patterns) is incorporated.

In some examples, the continuous learning system 214 can maintain a version history of the knowledge graph 208. The version history can include a record of updates, such as additions, modifications, or deletions of nodes or relationships. In some examples, the continuous learning system 214 can include contextual metadata to each update, such as a timestamp, a source identifier, or a confidence score (e.g., generated by the adaptive reasoning engine 210). In examples, the continuous learning system 214 can then calibrate the confidence scores for knowledge graph entries based on new evidence from processed scene graphs. The continuous learning system 214 can use pattern recognition algorithms to track the frequency of specific relationships or entities and use such tracking to inform the adjustment of relationship weights. In examples, the continuous learning system 214 can provide feedback to other components, such as the dynamic scene graph generator 206, based on the results of the updates to the knowledge graph 208 or detected output drift by the continuous learning system 214.

In some embodiments, the multimodal output generator 216 can receive outputs from the adaptive reasoning engine 210 (or the knowledge graph 208, though not explicitly illustrated) and process the outputs. Additionally, or alternatively, the multimodal output generator 216 can be configured to analyze a query type or user preferences to determine an output modality for the output of the multimodal output generator 216. In response, the multimodal output generator 216 can select one or more output formats based on the analysis, such as text, annotated images, generated scenes, interactive visualizations, or audio outputs etc., and generate an output. As an example, the multimodal output generator 216 can generate a text explanation by processing reasoning steps or conclusions from the adaptive reasoning engine 210. The multimodal output generator 216 can then generate annotated images by overlaying explanatory information onto visual data and/or generating reports highlighting detected objects, relationships, or reasoning steps performed etc. In some examples, the multimodal output generator 216 can generate interactive visualizations by constructing navigable charts, graphs, or scene representations based on data from the knowledge graph 208 or the adaptive reasoning engine 210. In at least some examples, the multimodal output generator 216 can generate audio outputs by converting text-based explanations or reasoning results into synthesized speech. The multimodal output generator 216 can generate multiple outputs in parallel or in sequence, based on user preferences or task requirements.

The generated outputs can be provided to a user interface of a client device or a downstream processing system for further use or display.

Figure 3:
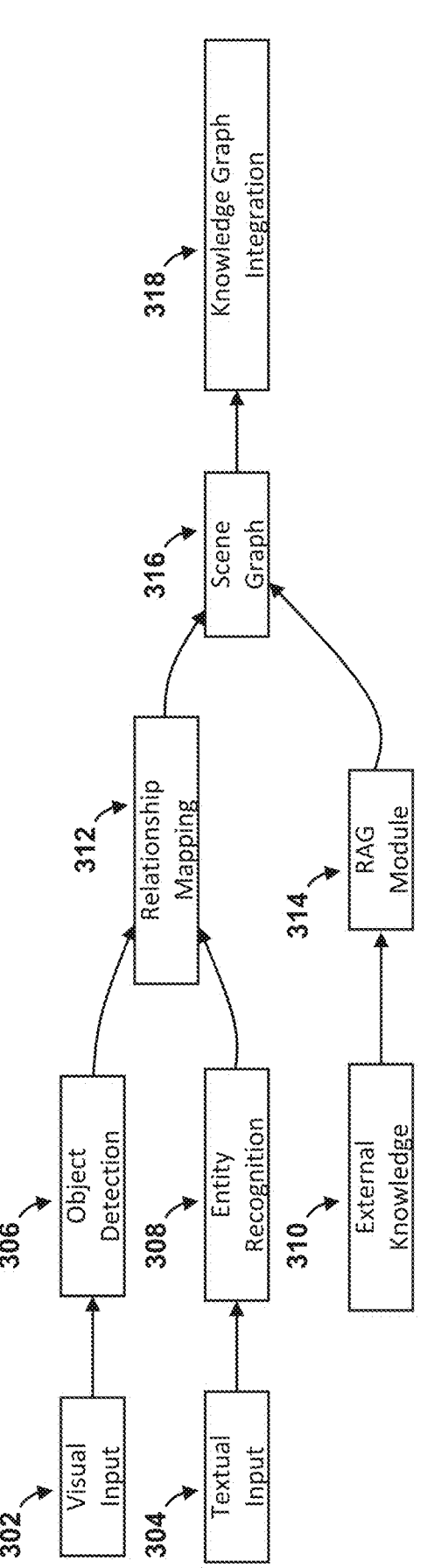
FIG. 3 is a block diagram illustrating a process for scene graph generation for knowledge graph generation or updates, in accordance with one or more embodiments.

Referring now to FIG. 3, illustrated is a block diagram of a process 300 for scene graph generation to allow for knowledge graph generation or updates, in accordance with one or more embodiments. The process 300 can involve the processing of a visual input 302 (including sensor data described herein), a text input 304, and/or external knowledge 310, and the execution of one or more of operations associated with object detection 306, entity recognition 308, relationship mapping 312, a RAG system 314, a scene graph 316, and knowledge graph integration 318. In some examples, the process 300 can be implemented by any suitable device of FIG. 1, such as the devices 107 or the analytics server 104. For ease of description, certain operations described as performed with respect to FIG. 3 are described as performed by an analytics server that is the same as, or similar to, the analytics server 104.

In some examples, the analytics server can receive visual input 302 that can include images or video streams similar to those described herein. For example, the analytics server can receive the visual input 302 from one or more sensors, such as cameras positioned in a factory floor, cameras installed on vehicles operating in a factory or on other drivable surfaces, or cameras monitoring operator activity etc. The analytics server can then process the visual input 302 as raw visual data or preprocessed visual data for downstream analysis. For example, the analytics server can receive high-resolution camera feeds that can include real-time video streams, and use the visual input 302 for object detection and/or scene graph generation. In examples, the analytics server can then process static visual content represented by the visual input 302 to identify objects, attributes, or spatial relationships.

In at least some examples, the analytics server can receive text input 304 that can include natural language queries, contextual information, or prompts. The analytics server can receive text input 304 such as operator instructions, safety procedure descriptions indicating features to detect to allow for downstream determination of safe or not safe features and/or conditions in an environment in which vehicles are operating, or user queries about the environment as observed in the visual input 302, etc. The analytics server can then process the text input 304 to extract contextual or task-specific information from the visual input 302 that can guide further analysis. The analytics server can use a multi-modal large language model as described herein to process the text input 304, extract relevant entities, context, or instructions, and integrate such information with visual data. For example, the analytics server can parse a text prompt indicating required personal protective equipment for certain environments where vehicles are operating to improve scene understanding.

In some examples, the analytics server can perform object detection 306 by identifying and localizing objects within the visual input 302. The analytics server can use computer vision models, such as neural networks, attention-based networks such as visual transformers, etc., as described herein to detect and classify objects in the input images or videos. For example, the analytics server can detect forklifts, helmets, or machinery in a video frame. The analytics server can then extract object-level features from the visual data for use in constructing a scene graph representing at least a portion of the state of an environment at a point in time. Based on the object-level features, the analytics server can recognize and annotate (e.g., label) individual objects in the visual input 302. For example, the analytics server can perform entity recognition 308 by extracting and identifying entities from the text input 304 or from multi-modal data. The analytics server can use natural language processing or multi-modal analysis to identify entities such as operator, forklift, or safety zone etc. The analytics server can then map the text or visual features to structured entities for downstream reasoning.

In some examples, the analytics server can access external knowledge 310 that can include a repository or source of domain-specific or contextual information external to the immediate input. The analytics server can access the external knowledge 310 as represented by a knowledge graph of safety procedures, equipment specifications, or prior incident reports etc. The analytics server can use retrieval-augmented generation to incorporate relevant information from domain-specific unstructured documents. In some examples, the analytics server can query the external knowledge 310 to retrieve facts or relationships that can supplement the understanding of objects, entities, or relationships detected in the scene (represented by the labels and/or annotations as described above). For example, the analytics server can query a knowledge base for standard operating procedures to validate detected scene elements and determine whether one or more unsafe conditions are present by virtue of the operation of vehicles in the environment.

In some examples, the analytics server can perform relationship mapping 312 by identifying and defining relationships between detected objects and recognized entities represented by the visual input 302. In these examples, the analytics server can analyze spatial, temporal, or contextual cues to define edges between nodes in the scene graph. The analytics server can then map relationships indicating, for example, an operator near the forklift or a helmet being worn by an operator of the forklift or other individuals within a threshold distance to the forklift. The analytics server can use rule-based or learned models to infer relationships from co-occurrence or proximity in visual or text data.

In some examples, the analytics server can include a retrieval-augmented generation system 314 that can retrieve and integrate external knowledge into the scene and knowledge graph generation process. The analytics server can use the retrieval-augmented generation system 314 to query external databases or knowledge graphs to supplement scene understanding. For example, the analytics server can dynamically formulate context-aware queries, evaluate the relevance of retrieved information, and integrate pertinent data into ongoing analysis by including annotations to incorporate into the scene graph 316. In some examples, the analytics server can use the retrieval-augmented generation system 314 to validate detected relationships in a scene by querying a safety knowledge base.

In examples, the analytics server can generate the scene graph 316 to include a structured representation of the environment represented by the visual input 302, with nodes representing objects or entities and edges representing relationships between the objects or entities as represented by the visual input 302. The analytics server can then generate the scene graph 316 by combining (e.g., fusing) outputs from object detection, entity recognition, relationship mapping associated with the object detection 306 and/or the entity recognition 308, or external knowledge retrieval associated with the RAG system 314. For example, the analytics server can integrate detected objects, recognized entities, or mapped relationships into a graph data structure associated with the scene graph 316. The analytics server can generate the scene graph 316 to represent operators, vehicles (e.g., forklifts, etc.), or other equipment (e.g., helmets, reflective vests, etc.) as nodes, and relationships indicating, for example, that an individual is wearing, operating, or near the vehicles, equipment, etc., as edges.

In some examples, the analytics server can perform knowledge graph integration 318 by merging the scene graph 316 into a persistent, evolving knowledge graph maintained by and/or accessible by the analytics server. The analytics server can verify consistency (e.g., based on confidence values represented by the scene graph 316 and objects in the knowledge graph), merge new information, assign and/or update confidence scores, maintain versioning, or resolve conflicts as the analytics server incorporates scene graph data. For example, the analytics server can update a central knowledge graph with new or updated relationships, or context derived from the current scene. The analytics server can use algorithms to detect and resolve conflicts, attach metadata, or update hierarchical knowledge structures as part of the knowledge graph integration 318.

Figure 4:
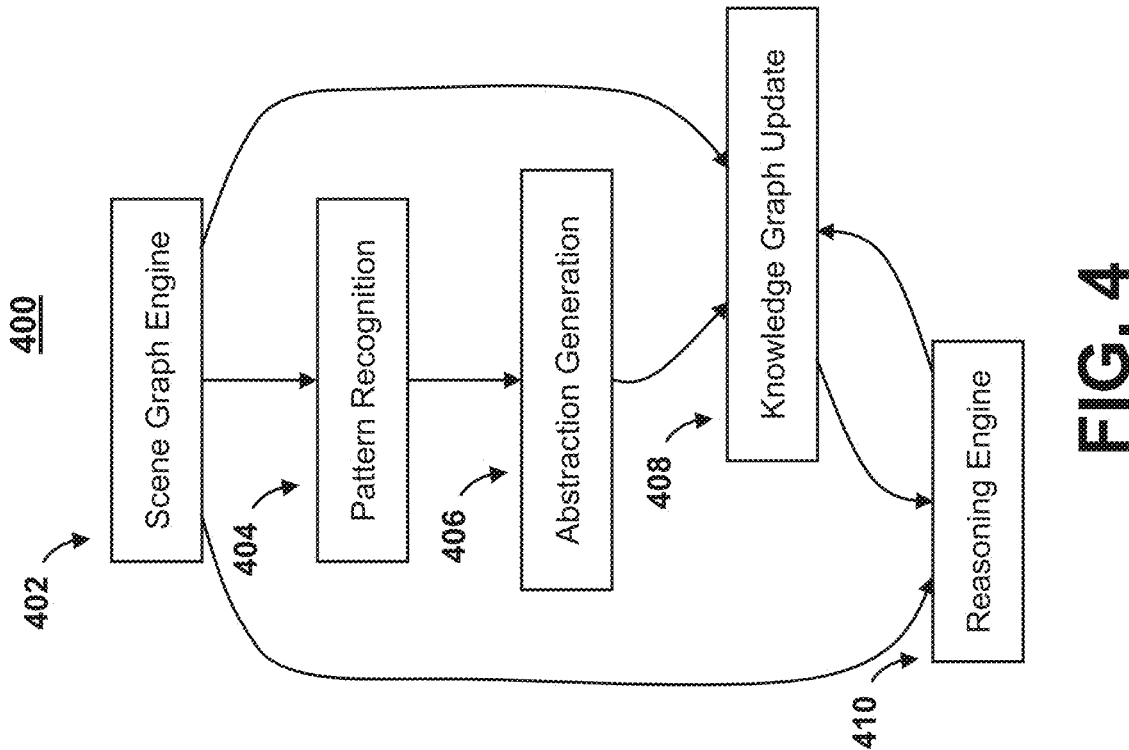
FIG. 4 is a block diagram illustrating a process for continuous learning and knowledge evolution to maintain a knowledge graph, in accordance with one or more embodiments.

Referring now to FIG. 4, illustrated is a block diagram of a process 400 for continuous learning and knowledge evolution to maintain a knowledge graph, in accordance with one or more embodiments. The process 400 can include a scene graph engine 402, a pattern recognition system 404, an abstraction generation system 406, a knowledge graph update system 408, and a reasoning engine 410. In some examples, the process 200 can be implemented by any suitable device of FIG. 1, such as the devices 107 or the analytics server 104. For ease of description, certain operations described as performed with respect to FIG. 4 are described as performed by an analytics server that is the same as, or similar to, the analytics server 104.

In some examples, the scene graph engine 402 can be configured to generate a scene graph that is the same as, or similar to, the scene graph 316 described with respect to FIG. 3. The scene graph engine 402 can receive multi-modal input data, such as images, video streams, textual descriptions, or contextual prompts etc. The scene graph engine 402 can then process the multi-modal input data to identify objects, attributes, or relationships present within a visual scene. In some examples, the scene graph engine 402 can use (e.g., implement) a multi-modal attention-based model (e.g., a large language model, a vision transformer, or combinations thereof) to generate a unified representation of an environment in which objects and/or agents are located and/or operating from the input data. In response to receiving the unified representations, the scene graph engine 402 can recognize and label objects, assign attributes to the objects, or map spatial or action relationships among the objects. Examples include the scene graph engine 402 identifying a forklift, a pallet, or an operator etc., and determining that the operator is near the forklift or that the pallet is on the forklift. The scene graph engine 402 can generate a scene graph in the same manner as described for the scene graph 316, such that the scene graph encodes the objects, attributes, and relationships derived from the multi-modal input data.

In some examples, the pattern recognition system 404 can receive the scene graph generated by the scene graph engine 402. The pattern recognition system 404 can then analyze the scene graph (in isolation or in view of a knowledge graph or one or more earlier-generated scene graphs) to identify recurring patterns, trends, or relationships across multiple scenes. The pattern recognition system 404 can then analyze the scene graph to identify recurring patterns, trends, or relationships across multiple scenes. In some examples, the pattern recognition system 404 can use the identified patterns to track objects across multiple scene graphs, to determine that separately-identified objects in different scene graphs are in fact the same object, etc., such that the knowledge graph can reference a unified object entity. The pattern recognition system 404 can apply statistical analysis, clustering, or machine learning techniques to the scene graph data. Examples include the pattern recognition system 404 detecting frequently co-occurring object pairs or spatial arrangements, such as repeated proximity between operators and specific equipment. The pattern recognition system 404 can extract higher-level insights from the scene graph data to inform subsequent abstraction generation. The higher-level information extracted by the pattern recognition system 404 from the scene graph data can then be used by the analytics server when executing the abstraction generation system 406.

In examples, the abstraction generation system 406 can receive as input one or more outputs from the pattern recognition system 404, where the outputs can include information such as object classifications, agent activities, or detected relationships identified across multiple scene graphs. The abstraction generation system 406 can analyze the received outputs to identify instances in which multiple scene graphs include classifications or detections that, in isolation, would result in duplicate representations of the same object or agent activity. The abstraction generation system 406 can consolidate such classifications by mapping recurring or overlapping detections to a single representation. The abstraction generation system 406 can generate higher-level representations by synthesizing generalized concepts from the consolidated information, such as representing a repeated detection of an operator near equipment as a single node or relationship in the knowledge graph. The abstraction generation system 406 can then output the information in a format that does not introduce duplicate or conflicting entries with respect to the information already maintained in the knowledge graph. In some examples, the abstraction generation system 406 can reference the current state of the knowledge graph to determine whether a proposed update would result in a conflict or redundancy and can modify the output to maintain consistency within the knowledge graph.

In some examples, the knowledge graph update system 408 can receive new scene graph information as well as information generated by the abstraction generation system 406. The knowledge graph update system 408 can incrementally expand and refine the knowledge graph using the new information described above. The knowledge graph update system 408 can then merge new scene graph information, resolve conflicts, maintain versioning, and/or integrate abstractions at appropriate hierarchical levels. Examples include the knowledge graph update system 408 assigning confidence scores to new nodes or edges (or to updates to the nodes or edges), attaching contextual metadata such as source identifiers or timestamps, and maintaining a history of updates. The knowledge graph update system 408 can perform consistency checking and conflict resolution to provide that the knowledge graph accurately reflects the evolving state of the environment.

In some examples, the reasoning engine 410 can receive the updated knowledge graph based on execution of the knowledge graph update system 408, and process (e.g., traverse) the knowledge graph in response to queries or when determining whether one or more features, etc., are present in the environment. As part of this traversal, the reasoning engine 410 can follow edges between related nodes to identify relevant subgraphs that match patterns stored in its strategy library (e.g., a collection of predefined reasoning strategies and associated patterns used to select, apply, or modify reasoning approaches based on knowledge graph traversal), using the matched subgraph's attributes and relationships to determine whether to apply, adjust, or switch reasoning modes for the current task. For example, the reasoning engine 410 can select or modify reasoning strategies (e.g., approaches or methods such as few-shot learning, zero-shot execution, or chain-of-thought reasoning used to process a knowledge graph and generate context-aware outputs) in response to task requirements (e.g., in response to a query from a user or in response to confirming that control signals are appropriate for execution based on a state of the environment). In some examples, the reasoning engine 410 can analyze the structure or content of a received query, the available nodes and relationships in the knowledge graph, or contextual metadata to determine an appropriate reasoning approach. The reasoning engine 410 can switch between different reasoning modes, such as few-shot learning, zero-shot execution, or chain-of-thought reasoning, based on the characteristics of the task or intermediate results. In some examples, the reasoning engine 410 can update or refine the selected reasoning strategy during execution in response to new information, user input, or feedback from other systems. In at least some examples, the reasoning engine 410 can incorporate external knowledge, retrieved facts, or user preferences to adjust the reasoning process. The reasoning engine 410 can quantify uncertainty or assign confidence scores to reasoning outcomes and can use such information to guide further reasoning steps or prompt for additional data, and support multiple reasoning modes such as few-shot, zero-shot, or chain-of-thought reasoning. The reasoning engine 410 can dynamically select reasoning strategies based on task requirements and available information. Examples include the reasoning engine 410 answering text-based queries or generating explanations based on the current state of the knowledge graph. The reasoning engine 410 can provide outputs or feedback to other systems, such as the scene graph engine 402 or the pattern recognition system 404, based on the results of the reasoning process.

Referring now to FIG. 5, depicted is a flow diagram illustrating a process 500 for executing cascaded visual reasoning tasks by decomposing a complex task 502 (e.g., a visual reasoning operation that can require decomposition into multiple subtasks for analysis, such as detecting, classifying, or relating objects and agents within an environment) into subtasks executed by one or more subtask execution systems 506a-506c (referred to individually as a subtask execution system 506 and collectively as one or more subtask execution systems 506, where contextually appropriate) and processing the subtasks 506a in parallel, in accordance with one or more embodiments. The process 500 can involve obtaining a complex task 502, a task decomposition system 504 configured to decompose the complex task into subtasks, execution of one or more subtask execution systems 506 to execute a respective subtask and generate a corresponding intermediate result 508a-508c (referred to individually as an intermediate result 508 and collectively as intermediate results 508, where contextually appropriate), a result integration system 510 configured to integrate the intermediate results 508, and a final output 512. In some examples, the process 500 can be implemented by any suitable device of FIG. 1, such as the devices 107 or the analytics server 104. For ease of description, certain operations described as performed with respect to FIG. 5 are described as performed by an analytics server that is the same as, or similar to, the analytics server 104.

The analytics server 104 can obtain a complex task 502. The complex task 502 can include a visual reasoning operation that requires decomposition into multiple subtasks 506, as described with respect to the cascaded task execution system of FIG. 5. The analytics server 104 can receive the complex task 502 as an input from an external source, such as a user interface, a client device, etc., described herein that are executed by an analytics server. For example, the complex task 502 can specify one or more objectives, constraints, or requirements for visual reasoning (e.g., to be implemented when processing visual input (e.g., that is the same as, or similar to, the visual input 302 of FIG. 3) and/or text input (e.g., that is the same as, or similar to, the text input 304 of FIG. 3) generated during operation of vehicles, etc., in an environment. The analytics server 104 can prepare the complex task 502 for further processing by identifying the scope and context of the task 502. In some examples, the analytics server 104 can then provide the complex task 502 as an input to the task decomposition system 504 to be divided into one or more subtasks. In some examples, the analytics server 104 can execute the task decomposition system 504 to decompose the complex task 502 by discretizing the environment into a plurality of spatial regions. In this example, the analytics server 104 can assign each spatial region to a respective subtask 506 or set of subtasks 506. As one example, the analytics server 104 can execute subtasks 506 to classify objects represented in each spatial region based on sensor data or scene graph information associated with the spatial region. The analytics server 104 can then generate a mapping between each classified object and the corresponding spatial region for use in downstream reasoning or control operations (e.g., when updating a knowledge graph as described herein).

As described above, the analytics server can decompose the complex task 502 into a plurality of subtasks. In some examples, the analytics server can use a task decomposition system 504 to identify discrete subtasks 506 that correspond to individual operations or analytical steps (e.g., detecting objects and/or agents in the environment, detecting relationships between the objects and/or agents, etc.) involved in execution of the complex task 502. In these example, the analytics server can analyze the requirements or objectives specified in the complex task 502 to determine logical divisions or dependencies among the subtasks 506. The analytics server can then generate a structured representation of the subtasks 506, including metadata describing the relationship of each subtask to the complex task 502. In some examples, the analytics server can then provide instructions associated with the subtasks 506 or the results from execution of the subtasks 506 as input to the results integration system 510.

The task decomposition system 504 can be implemented by the analytics server using various model architectures that are suitable for breaking down high-level or complex tasks into discrete subtasks or actionable components. In some examples, sequence-to-sequence neural network models can be used to map an input task description onto a series of lower-level task steps. Transformer-based models can allow the task decomposition system to attend to different elements within the complex task and infer logical boundaries for subtask formation. Additionally, or alternatively, graph-based neural networks can model dependencies between various operations and can be used to uncover task hierarchies or parallelization opportunities within the input task. Hybrid architectures can combine rule-based heuristics with data-driven neural models to address both structured and unstructured task definitions.

The task decomposition system 504 can receive as input a representation of a complex task 502, which can include a natural language description, a structured workflow, or an annotated visual scenario that specifies the desired overall objective. The task decomposition system 504 can process this input to identify constituent elements, dependencies, or constraints, and can output a set of discrete subtasks accompanied by metadata describing relationships or ordering among these components. These subtasks can include analytical operations, classification actions, or coordination steps required for full task completion, and the output can be structured in a format that supports parallel or sequential execution by downstream modules or agents.

Training the task decomposition system 504 can involve providing the model with pairs of complex tasks and corresponding ground-truth subtask decompositions as annotated by human experts or generated from procedural templates. During training, the input complex task can be processed by the task decomposition system 504 to generate a predicted decomposition, which is then compared to the target subtask breakdown using a decomposition alignment loss or step-wise matching metric. Weight updates can be performed through backpropagation, with gradients computed in accordance with the discrepancy between predicted and actual decompositions. Repeated iterations of this process can allow the task decomposition system 504 to improve its accuracy in mapping complex tasks to appropriate subtask sequences and to learn nuanced patterns of dependency or operational flow from a diverse training set.

During execution of the subtasks 506, the analytics server can execute each of the subtasks 506 in parallel or in sequence (e.g., where the subtasks 506 are interdependent with one another). The subtasks 506 can each be processed by a respective subtask execution system 506. In examples, the analytics server can allocate computational resources to each subtask 506 based on task complexity, priority, or resource availability. The analytics server can use the information and requirements specified for each subtask 506 to perform one or more analytical, computational, or reasoning operations. After successful execution of the subtasks 506, the analytics server 104 can generate intermediate outputs 508 for corresponding subtasks 506, which can be provided as input to the result integration system 510 to allow for execution of the result integration system 510. The intermediate results 508 can represent partial outputs or analytical findings associated with the corresponding subtasks 506. In some examples, the analytics server can collect, store, or annotate the intermediate results 508 with metadata describing the subtask, processing context, or confidence score. The analytics server can organize the intermediate results 508 for subsequent integration by the result integration system 510.

The analytics server can integrate the intermediate results 508 using a result integration system 510. The result integration system 510 can combine the intermediate results 508 to form a unified analytical output (referred to as a final output 512). The analytics server can use one or more integration strategies, such as aggregation, ranking, or conflict resolution, to fuse the intermediate results 508 into the final output 512. For example, the analytics server can execute the result integration system 510 to generate a final output 512 that represents a consolidated result indicating the outcomes of the execution of the subtasks 506 and satisfies the requirements of the complex task 502. The analytics server can then provide the final output 512 as input to one or more downstream systems and/or systems to allow for execution of the one or more downstream systems and/or systems (e.g., the updating of a knowledge graph as described herein).

Figure 6:
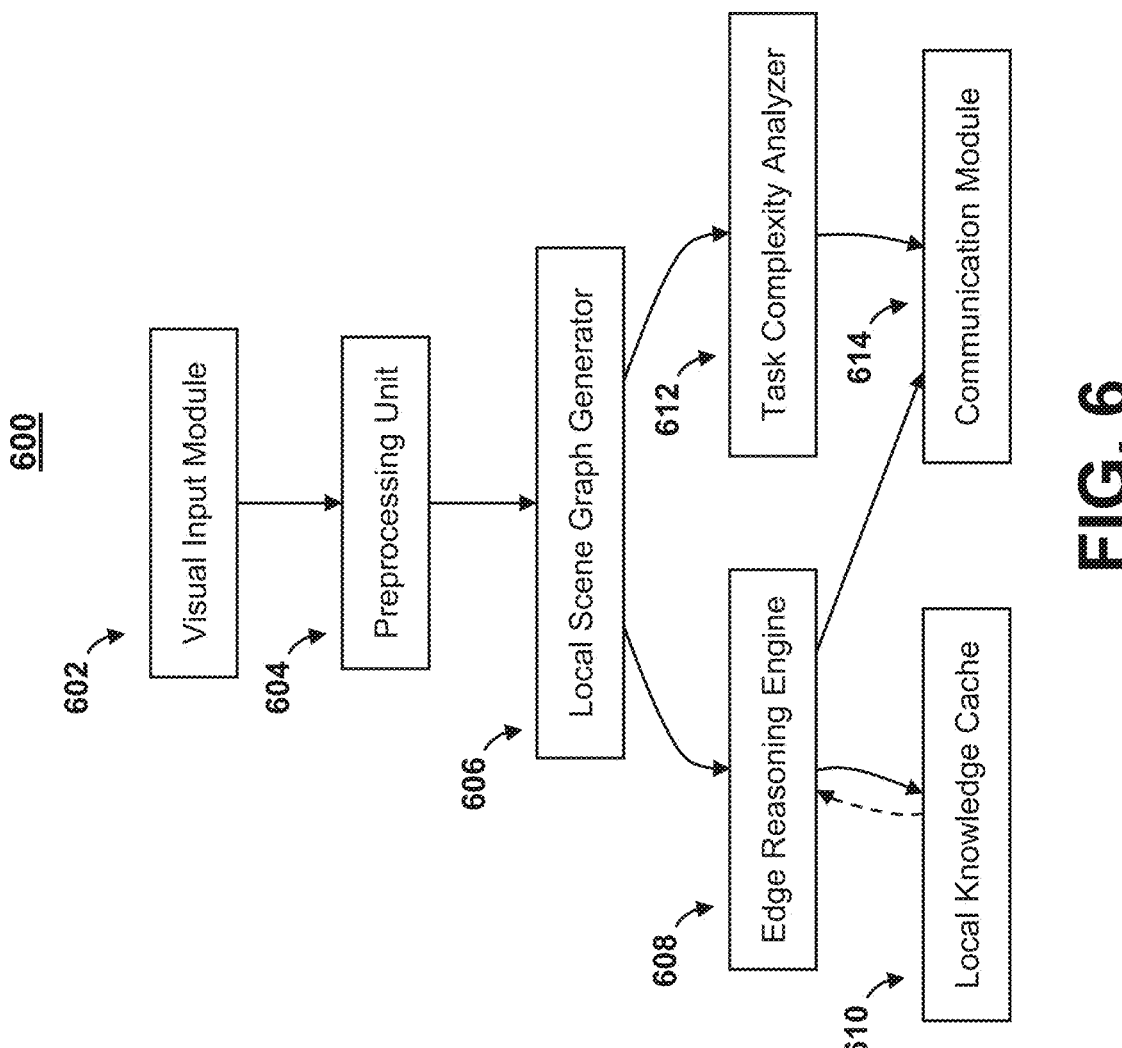
FIG. 6 is a flowchart illustrating the decision-making process for task processing in a distributed visual reasoning system, in accordance with one or more embodiments.

Referring now to FIG. 6, illustrated is a flowchart of an example decision-making process 600 for task processing in a distributed visual reasoning system, in accordance with one or more embodiments. The process 600 can include a visual input system 602, a preprocessing unit 604, a local scene graph generator 606, an edge reasoning engine 608, a local knowledge cache 610, a task complexity analyzer 612, and a communication system 614. The process 600 can involve receiving visual input data at the visual input system 602 and processing the data through the preprocessing unit 604 to generate preprocessed data. The local scene graph generator 606 can then generate a local scene graph from the preprocessed data, and the edge reasoning engine 608 can execute reasoning tasks using the local scene graph and the local knowledge cache 610. The task complexity analyzer 612 can determine whether to execute the task locally or offload the task to another system and/or device using the communication system 614. The output of the process 600 can include a processed scene graph, a reasoning result, or a control signal for use by downstream systems or systems (e.g., implemented by an analytics server as described herein). In some examples, the process 600 can be implemented by any suitable device of FIG. 1, such as the devices 107 or the analytics server 104. For ease of description, certain operations described as performed with respect to FIG. 6 are described as performed by an analytics server that is the same as, or similar to, the analytics server 104.

In some examples, an analytics server can execute a visual input system 602. The visual input system 602 can capture or otherwise obtain visual data (also referred to as sensor data) from one or more sources, such as sensors installed on vehicles operating in the environment represented by the visual data or otherwise positioned in the environment where the vehicle is operating. In some examples, the visual input system 602 can interface with hardware sensors or receive data streams from connected devices. In these examples, the visual input system 602 can obtain visual input for further processing in the distributed visual reasoning system. In some examples, the visual input system 602 can continuously acquire image frames for real-time analysis.

The analytics server can execute a preprocessing unit 604 to process the visual data output by the visual input system 602. The preprocessing unit 604 can process the visual data output by the visual input system 602 to prepare the visual input for scene graph generation. In some examples, the preprocessing unit 604 can apply filtering, resizing, or encoding techniques to the input data to preprocess the visual data and normalize the visual data, transforming the raw sensor data into a format suitable for downstream analysis (e.g., compatible with the inputs for one or more of the machine learning models described herein). In some examples, the preprocessing unit 604 can apply computer vision algorithms to enhance image quality or extract salient features.

The analytics server can execute a local scene graph generator 606. The local scene graph generator 606 can create structured representations of the visual scene from visual data. In some examples, the local scene graph generator 606 can use object detection, relationship extraction, or graph construction algorithms. The local scene graph generator 606 can then generate a scene graph that encodes objects, attributes, or spatial or action relationships in the environment as represented by the visual data. In some examples, the local scene graph generator 606 can use deep learning models to identify objects and relationships and construct a graph data structure as described herein.

In embodiments, the analytics server can execute an edge reasoning engine 608. The edge reasoning engine 608 can be configured to perform reasoning tasks on the scene graph generated by the local scene graph generator 606. In some examples, the edge reasoning engine 608 can execute reasoning tasks using the local scene graph and cached knowledge (e.g., associated with previously-generated visual data, scene graphs and/or a knowledge graph). The edge reasoning engine 608 can then apply logical rules, pattern matching, or machine learning inference to the scene graph to update the scene graph. In some examples, the edge reasoning engine 608 can determine whether a safety violation is present or whether further analysis is needed.

In some embodiments, the analytics server can maintain a local knowledge cache 610. The local knowledge cache 610 can be a memory or storage device that retains frequently used knowledge or context for the edge reasoning engine 608. In some examples, the local knowledge cache 610 can store recent scene graphs, known object labels, or operational rules. The local knowledge cache 610 can provide access to relevant knowledge for local reasoning or decision-making. In some examples, the local knowledge cache 610 can be updated based on recent reasoning outcomes or knowledge base updates.

In some embodiments, the analytics server can execute a task complexity analyzer 612. The task complexity analyzer 612 can evaluate the complexity of a given reasoning or processing task. In some examples, the task complexity analyzer 612 can determine whether to process a task locally or offload the task to a data center (e.g., an analytics server implemented at a remote datacenter). The task complexity analyzer 612 can use heuristics, resource monitoring, or predictive models to assess task requirements. In some examples, the task complexity analyzer 612 can consider CPU load, memory usage, or task type when making a determination of whether to offload the task to the data center.

The analytics server can implement a communication system 614. The communication system 614 can manage secure data exchange between the analytics server and the data center or other networked entities. In some examples, the communication system 614 can transmit data, such as scene graphs or reasoning results, to remote systems for further processing or aggregation. The communication system 614 can use secure network protocols, data serialization, or bandwidth optimization techniques. In some examples, the communication system 614 can send compressed scene graph data to the data center when local resources are constrained.

Figure 7:
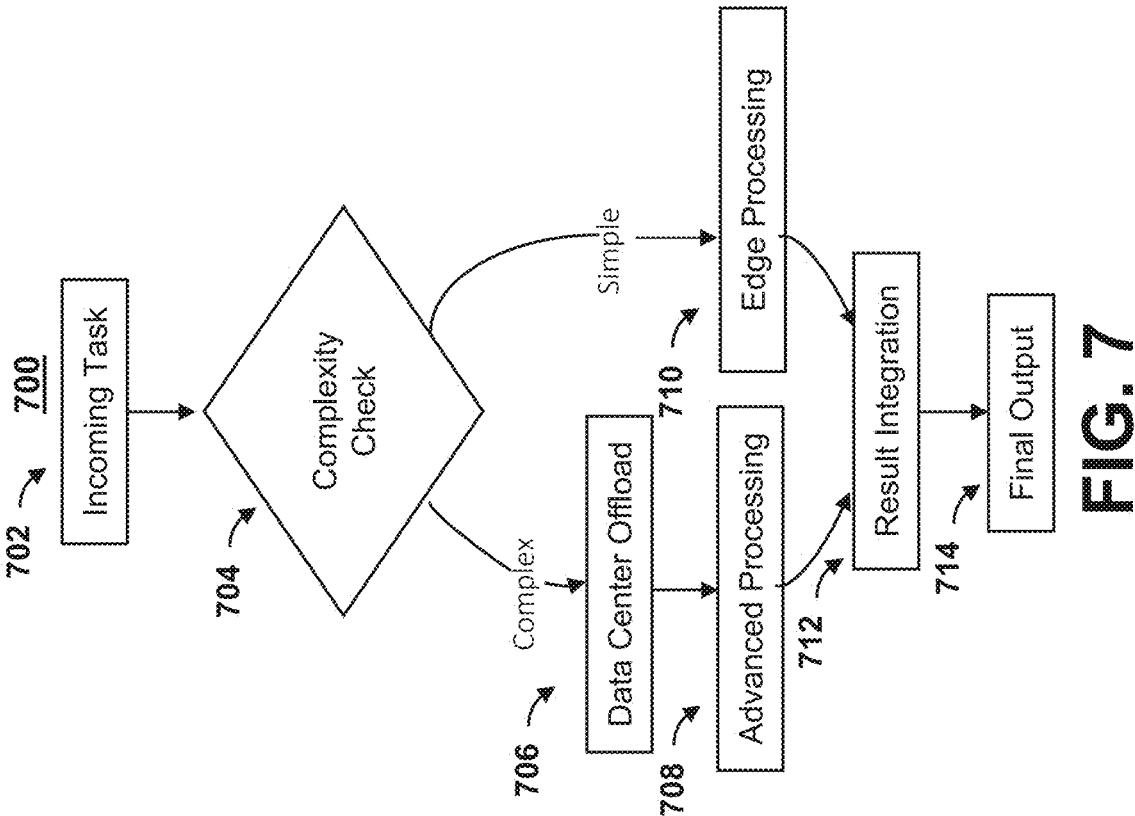
FIG. 7 is a flowchart illustrating a process for task processing by an analytics server, in accordance with one or more embodiments.

Referring now to FIG. 7, illustrated is a process 700 of task processing by an analytics server, in accordance with one or more embodiments. The process 700 can be executed, performed, or otherwise carried out by any of the computing systems or devices described herein. In some embodiments, process 700 can begin when a system (such as an analytics server as described herein) receives an incoming task and performs a complexity check. If deemed complex, the task is offloaded to the data center for advanced processing; if simple, it is handled locally at the edge. Both one or more of the processing results can then be provided into a result integration system 712, which is configured to produce a final output 714. In some examples, the process 700 can be executed by any suitable device of FIG. 1, such as the devices 107 or the analytics server 104. For ease of description, certain operations described as performed with respect to FIG. 7 are described as performed by an analytics server that is the same as, or similar to, the analytics server 104.

At 702, the process 700 can include receiving an incoming task at an analytics server. An analytics server can receive the incoming task from an external source, such as a user interface or a client device. The incoming task can specify one or more objectives, constraints, or requirements for visual reasoning. The analytics server can then prepare the incoming task for further processing by identifying the scope or context of the incoming task. In some examples, the analytics server can provide the incoming task as input to a subsequent processing stage for further analysis or decomposition.

At 704, the process 700 can include performing a complexity check. The complexity check can determine whether an incoming task is simple or complex. The complexity check can analyze one or more attributes of the incoming task, such as computational requirements, data dependencies, or required reasoning depth. In some implementations, the complexity check can use a task complexity analyzer 612 to evaluate the incoming task. The task complexity analyzer 612 can assess available computational resources, current system load, or predefined thresholds to classify the task. In some examples, the complexity check can result in the generation of an indicator or flag that specifies whether the task should be processed locally or offloaded to a data center for advanced processing. The result of the complexity check can be used to determine the subsequent processing path for the incoming task within the distributed visual reasoning system.

At 706, in response to determining that the incoming task at 702 is complex, the process 700 can include offloading the incoming task to a data center for further processing. In some examples, the data center can receive the incoming task from the analytics server and allocate computational resources to perform advanced processing operations associated with the incoming task. The analytics server can transmit data associated with the incoming task to the data center using the communication system 614. The data center can store intermediate or final results generated during advanced processing and can transmit such results back to the analytics server for integration with results from other processing paths.

At 708, the process 700 can include performing advanced processing. In some implementations, the analytics server 104 can perform advanced processing operations by executing one or more reasoning tasks that require access to a comprehensive knowledge base or resource-intensive computation. The analytics server 104 can receive data offloaded from an edge device (e.g., an analytics server implemented by a device (e.g., device 107) of a vehicle) or another component in the distributed visual reasoning system. The analytics server 104 can process the received data by generating or updating a global scene graph, performing retrieval-augmented generation to incorporate external knowledge, or executing adaptive reasoning strategies such as few-shot learning, zero-shot execution, or chain-of-thought reasoning. In some implementations, the analytics server 104 can use a dynamic knowledge graph integrator to update a knowledge graph based on new scene graph information or detected changes in the environment. The analytics server 104 can store intermediate or final results generated during the advanced processing and can transmit such results back to the originating edge device or another system component for result integration.

At 710, in response to determining that the incoming task at 702 is not complex, the process 700 can include performing edge processing. In some examples, the edge device can execute one or more reasoning tasks using a local scene graph generated from preprocessed visual input data. The edge device can access a local knowledge cache to retrieve context or previously stored information relevant to the reasoning task. The edge device can generate a reasoning result based on the local scene graph and the local knowledge cache. In some examples, the edge device can determine whether the reasoning result satisfies a predetermined criteria or threshold. The edge device can generate an output based on the reasoning result. The output can include a processed scene graph, a control signal, or a reasoning outcome for use by downstream systems or systems.

At 712, the process 700 can include integrating results. The analytics server can receive outputs from both edge processing and data center processing. The analytics server can aggregate the outputs to generate a unified result. In some implementations, the analytics server can resolve conflicts between outputs by applying confidence scores or contextual information. The analytics server can align overlapping elements, combine complementary information, or update a global data structure based on the aggregated results. The analytics server can store the integrated result for subsequent use or provide the integrated result to downstream systems for further processing.

At 714, the process 700 can include generating a final output. The analytics server can generate the final output by integrating results received from both edge processing and data center processing. The analytics server can aggregate the outputs to form a unified result. In some implementations, the analytics server can resolve conflicts between the outputs by applying confidence scores or contextual information. The analytics server can align overlapping elements, combine complementary information, or update a global data structure based on the aggregated results. The analytics server can store the final output for subsequent use or provide the final output to downstream systems for further processing.

Figure 8:
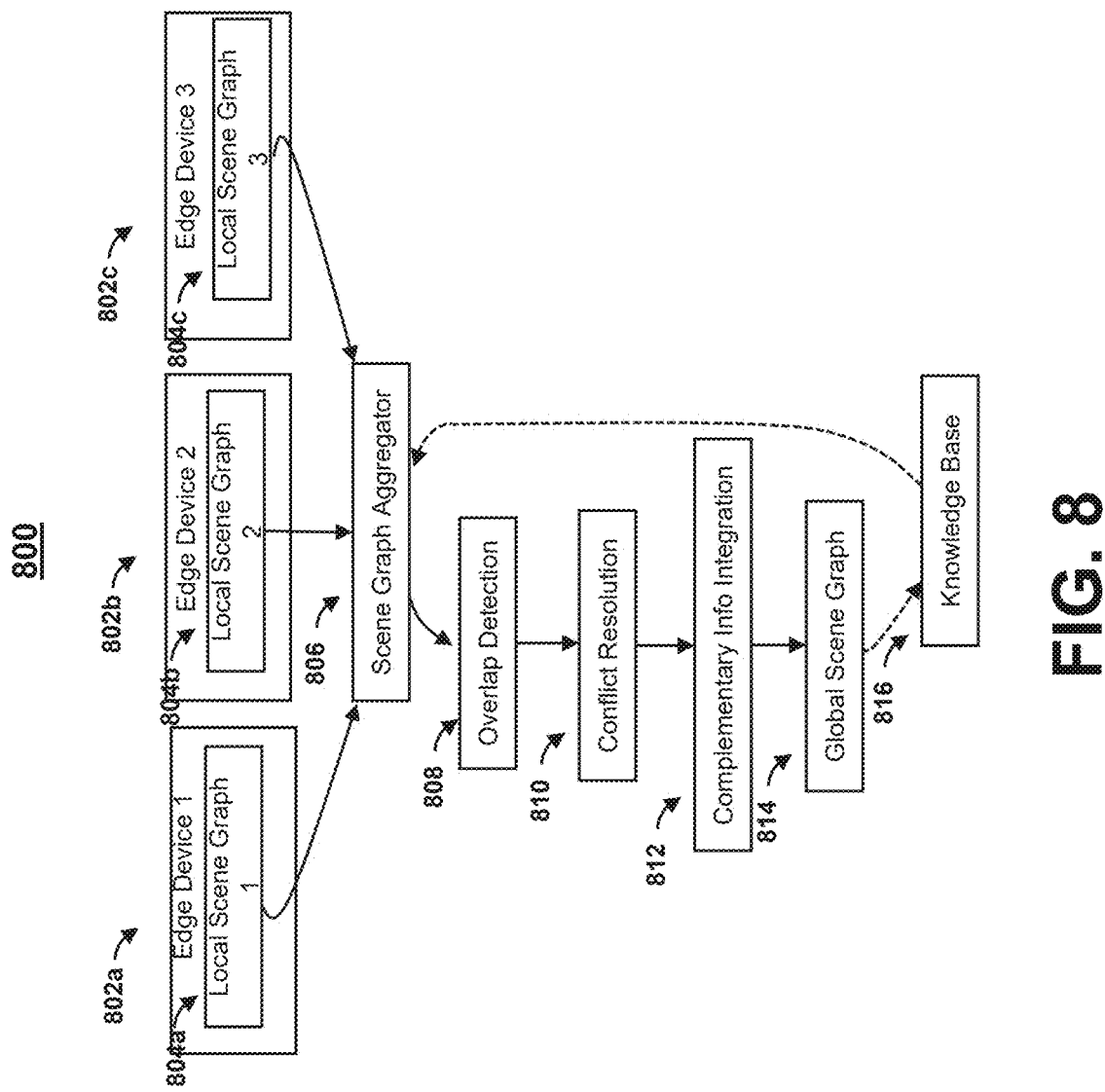
FIG. 8 is a block diagram illustrating a process of aggregating scene graphs from multiple edge devices to generate a consolidated global scene graph in a distributed visual reasoning system, in accordance with one or more embodiments.

Referring now to FIG. 8, illustrated is a block diagram of a process of 800 aggregating scene graphs from multiple edge devices to generate a consolidated global scene graph in a distributed visual reasoning system, in accordance with one or more implementations. The process 800 can include one or more edge devices 802a-802c, each comprising a respective local scene graph 804a-804c. The process 800 further includes a scene graph aggregator 806, which receives the local scene graphs and performs overlap detection system 808, conflict resolution 810, and complementary information integration 812. The output of these operations can include a global scene graph 814, which can interact with a knowledge base 816. In some examples, the process 200 can be implemented by any suitable device of FIG. 1, such as the devices 107 or the analytics server 104.

At 802a-802c, the process 800 can include the analytics server obtaining data from one or more edge devices 802a, 802b, or 802c (referred to individually as an edge device 802 and collectively as edge devices 802, where contextually appropriate). The edge devices 802 can be deployed on vehicles operating within the environment 100 (e.g., devices that are the same as, or similar to, the device 107 and/or analytics server 104 of FIG. 1) or distributed at fixed locations throughout the environment 100. For example, the edge devices 802 can include one or more sensors that are the same as, or similar to, the sensors 106 and/or the devices 107 of FIG. 1). The edge devices 802 can receive visual input (also referred to as visual data or sensor data) from sources such as cameras mounted on vehicles, cameras positioned on infrastructure, or embedded processors located in the environment 100, such as a warehouse, a factory floor, or another monitored area etc. The edge devices 802 can process the received visual input to generate local scene graphs 804*a*-804*c* (referred to individually as a local scene graph 804 and collectively as local scene graphs 804, where contextually appropriate). The local scene graphs 804 can represent a respective portion of the environment 100. In some examples, the edge devices 802 can include and/or implement components for visual input acquisition, preprocessing, local scene graph generation, an edge reasoning engine, a local knowledge cache, or a task complexity analyzer as described herein. Based on generating the local scene graphs 804, the edge devices 802 can transmit the local scene graphs 802 to a scene graph aggregator 806 for further processing or aggregation. The local scene graphs 804 generated by the edge devices 802 can represent a partial view of the environment 100 from the perspective or location of the corresponding edge device 802 (respectively), whether the edge device 802 is mounted on a vehicle or positioned at a fixed location. In some examples, the edge devices 802 can communicate with other edge devices 802 or with a central analytics server via a network to exchange scene graphs, reasoning results, or control signals etc.

In some examples, at 806, the process 800 can include the generation of one or more local scene graphs 804 by the edge devices 802 (or a centralized analytics server). The local scene graphs 804 can represent structured data models of the environment 100 as observed from each respective edge device 802. In some examples, each local scene graph 804 can encode detected objects, relationships, or attributes within the field of view of the corresponding edge device 802. For example, a local scene graph 804 can include nodes representing objects such as pallets, vehicles, or agents etc., and edges representing spatial or action relationships such as proximity, containment, or interaction etc. In some examples, the local scene graphs 804 can provide foundational data for subsequent aggregation, overlap detection, or conflict resolution performed by the scene graph aggregator 806. In some examples, the edge device 802 can include components for visual input, preprocessing, local scene graph generation, or an edge reasoning engine etc. The local reasoning engine of the edge device 802 can output a local scene graph 804 for its assigned area. The local scene graphs 804 can be transmitted to the scene graph aggregator 806 for further processing.

In some examples, at 806, the process 800 can include execution of the scene graph aggregator 806 to receive a plurality of local scene graphs from multiple edge devices 802. The scene graph aggregator 806 can process the local scene graphs 804 to identify overlapping entities or relationships present in more than one local scene graph 804. The scene graph aggregator 806 can determine such overlap by comparing semantic labels, spatial attributes, or object identifiers associated with nodes or edges in the local scene graphs 804. In response to detecting overlap, the scene graph aggregator 806 can align and combine the overlapping elements to form a unified representation.

In some examples, the scene graph aggregator 806 can analyze the local scene graphs to identify complementary information across different views of the environment. For example, in facility security, manufacturing line monitoring, or perimeter surveillance, one rooftop camera may detect an object's heat signature while a drone detects its geometry;

these complementary attributes can be integrated into the global scene graph to allow for more complete situational awareness. The scene graph aggregator 806 can determine that certain attributes, relationships, or entities are present in only a subset of the local scene graphs. The scene graph aggregator 806 can then integrate such complementary information by fusing unique nodes or relationships into the global scene graph 814. The scene graph aggregator 806 can use contextual metadata or confidence scores associated with each local scene graph 804 to determine the relevance or reliability of the complementary information.

In some examples, the scene graph aggregator 806 can detect potential conflicts or inconsistencies among the local scene graphs 804. The scene graph aggregator 806 can identify conflicts by comparing attributes, spatial positions, or relationship types for entities that are represented in more than one local scene graph 804. In some examples, the scene graph aggregator 806 can resolve conflicts using rules based on confidence scores (e.g., by selecting the object, agent, relationship having a highest confidence score), contextual information, or predefined aggregation policies. For example, the scene graph aggregator 806 can select the attribute value or relationship with the highest confidence score or can retain multiple conflicting values with associated probabilities.

In some examples, the scene graph aggregator 806 can obtain data associated with a knowledge base 816 to enrich the global scene graph 814 with additional context. The scene graph aggregator 806 can query the knowledge base 816 to retrieve relevant facts, relationships, or domain-specific information that can be incorporated into the global scene graph 814. Additionally, or alternatively, the scene graph aggregator 806 can update the knowledge base 816 with new or refined information derived from the global scene graph 814. The scene graph aggregator 806 can periodically disseminate relevant portions of the updated global scene graph 814 back to the edge devices 802 to provide that local reasoning capabilities reflect the most current aggregated knowledge.

In some embodiments, at 808, the process 800 can include an overlap detection system 808 that can receive a plurality of local scene graphs generated by edge devices 802. The overlap detection system 808 can analyze the local scene graphs 804 to identify common elements, such as objects or relationships, which are present in more than one local scene graph 804. The overlap detection system 808 can then compare nodes or edges in the local scene graphs 804 based on semantic labels, object identifiers, or spatial attributes. For example, the overlap detection system 808 can determine that two nodes from different local scene graphs 804 represent the same forklift based on matching semantic labels or object identifiers, even when the forklift is detected from different angles by separate edge devices (e.g., edge devices 802*a* and 802*b*). In some examples, the overlap detection system 808 can use confidence scores associated with each node or edge to determine whether the identified elements satisfy a threshold for overlap. The overlap detection system 808 can align and combine overlapping elements across the local scene graphs 804 based on the analysis, such that redundant or duplicate representations of the same object or relationship are merged. The output of the overlap detection system 808 can be provided to a subsequent conflict resolution system 810 for further processing.

In some examples, at 810, the process 800 can include conflict resolution 810. The conflict resolution system 810 can receive local scene graphs 804 generated by multiple edge devices 802. The conflict resolution system 810 can then analyze the local scene graphs to identify discrepancies or conflicting information among the local scene graphs 804. For example, conflict resolution 810 can receive two local scene graphs 804 that each indicate a position for an object, where the positions are not consistent with one another. The conflict resolution system 810 can apply one or more rules or algorithms to reconcile the differences between the local scene graphs 804. In some examples, the conflict resolution system 810 can determine a confidence score for each conflicting attribute or relationship, such as an object position or a detected relationship between entities. In examples, the conflict resolution system 810 can select the attribute or relationship having the highest confidence score or can use contextual information to resolve the conflict. In some examples, conflict resolution 810 can update the global scene graph 814 based on the reconciled information.

In some embodiments, at 812, the process 800 can include a complementary information integration system 812. The complementary information integration system 812 can receive local scene graphs 804 from multiple edge devices 802, where each local scene graph 804 can represent a partial view of the environment. In some examples, the complementary information integration system 812 can analyze the local scene graphs 804 to identify unique or non-overlapping information present in at least a subset of the local scene graphs 804. For example, the complementary information integration system 812 can receive a local scene graph 804 from edge device 802 that includes an object with a detected color attribute, while a different local scene graph 804 from a different edge device 802 does not include the color attribute for the same object. In response, the complementary information integration system 812 can merge the color attribute to generate the global scene graph 814 such that the global scene graph 814 includes the additional attribute. In some examples, the complementary information integration system 812 can merge unique nodes or relationships from individual local scene graphs 804, such as by adding new object attributes or relationships that are not present in other local scene graphs 804.

In some examples, at 814, the process 800 can include the generation of a global scene graph 814. The global scene graph 814 can represent a consolidated data structure that can be generated by merging or reconciling a plurality of local scene graphs 804 received from edge devices 802. The global scene graph 814 can include nodes or edges corresponding to detected objects, relationships, or attributes across the monitored environment. For example, the global scene graph 814 can include representations of pallets, vehicles, or agents etc., and can encode spatial or action relationships such as proximity or interaction. In some examples, the global scene graph 814 can serve as a unified model for downstream reasoning, knowledge updates, or dissemination to edge devices 802. The global scene graph 814 can be constructed through aggregation, overlap detection, conflict resolution, or complementary information integration steps. For example, the scene graph aggregator 806 can output the global scene graph 814 after processing all local scene graphs 804. In some examples, the global scene graph 814 can be used to further enrich the knowledge base 816.

In some examples, at 816, the process 800 can include maintaining a knowledge base 816. The knowledge base 816 can include a central repository of structured information, facts, or relationships that can inform or be updated by the global scene graph 814. For example, the knowledge base 816 can include a database storing historical or contextual information about the environment. In some examples, the knowledge base 816 can be queried during aggregation of local scene graphs 804 to provide additional context for generating the global scene graph 814. The knowledge base 816 can interact bidirectionally with the scene graph aggregator 806. The scene graph aggregator 806 can supply updates to the knowledge base 816 based on new or refined information from the global scene graph 814. In some examples, the knowledge base 816 can be updated after the global scene graph 814 is generated, such that the knowledge base 816 maintains an up-to-date model of the environment. The knowledge base 816 can provide context for aggregation by supplying information to the scene graph aggregator 806 or by being updated with new information from the global scene graph 814. In some examples, the knowledge base 816 can periodically disseminate relevant portions of the updated global scene graph 814 back to edge devices 802 to provide that local reasoning capabilities reflect the most current aggregated knowledge.

Referring now to FIG. 9, illustrated is a flowchart of a process 900 for processing multi-modal data representing an environment to generate scene graphs of the environment during automated operation of a vehicle, according to one or more embodiments. The process 900 can be executed, performed, or otherwise carried out by any of the computing systems or devices described herein. For example, the process 900 can be executed by any suitable device of FIG. 1, such as the devices 107 or the analytics server 104. For ease of description, certain operations described as performed with respect to FIG. 9 are described as performed by an analytics server that is the same as, or similar to, the analytics server 104.

In some embodiments, at block 902, an analytics server (e.g., a local compute server, an embedded hardware controller, a cloud analytics engine, etc. that are the same as, or similar to the analytics server 104 of FIG. 1 and/or implemented by the devices 107 of FIG. 1) can obtain sensor data associated with a vehicle operating in an environment. For example, the sensor data can include a first portion associated with a first sensor (e.g., a camera, a radar, a LiDAR, etc.) installed on a vehicle (e.g., that is the same as, or similar to, the vehicle 112 and/or the vehicle 116 of FIG. 1) or otherwise located in the environment and a second portion associated with a second sensor (e.g., an ultrasonic sensor, an IMU, a microphone, etc.) installed on the vehicle or in the environment. In at least some examples, the sensor data can be collected as raw binary data, structured data packets, or any other suitable representation that can be processed by the analytics server. In these examples, the environment can include a wide range of physical environments (e.g., a roadway, a warehouse, a parking facility, an urban intersection, etc.).

In embodiments, the sensor data can be generated over time and can include first sensor data as well as second sensor data associated with the vehicle operating in the environment at a second point in time after the first point in time. For example, the second sensor data can include a third portion associated with the first sensor (e.g., generated by the first sensor at a later point in time) and a fourth portion associated with the second sensor (e.g., generated at the later point in time), where the second sensor data can be generated after the first sensor data is generated. In these examples, the analytics server can update at least one relationship represented by a knowledge graph based on the second sensor data. In some examples, the control signal provided by the analytics server can comprise a first control signal, and the analytics server can be configured to generate a second control signal configured to adjust the operation of the vehicle in response to updating the knowledge graph.

In some embodiments, at block 904, the analytics server can determine a set of features associated with the environment based on the sensor data. For example, the set of features can include (e.g., indicate) one or more objects (e.g., other vehicles, fixed infrastructure, debris on the roadway, etc.) and one or more agents (e.g., pedestrians, bicyclists, construction workers, etc.). In at least some examples, the analytics server can use feature extraction algorithms (e.g., deep neural networks, clustering algorithms, heuristic classifiers, etc. as described herein) to identify features from the sensor data. For example, the analytics server can extract spatial coordinates, feature descriptors, and motion vectors corresponding to the objects and agents. Additionally, or alternatively, at block 906, the analytics server can generate an error message indicating that insufficient data is available to allow for operation of the vehicle. For example, in instances where one or more sensors are obstructed and/or failing, the analytics server can generate an error message that causes the vehicle to adjust operation (as described below) and/or generate a warning to caution agents in the environment of likely reduced performance of the vehicle when detecting objects during operation of the vehicle.

In embodiments, at block 908, based on determining the set of features, the analytics server can generate a scene graph. The scene graph can represent (e.g., encode) poses and velocities of the one or more objects and the one or more agents relative to the environment. For example, the scene graph can include nodes corresponding to the objects and agents and edges representing spatial or semantic relationships (e.g., adjacent to, in front of, following, etc.) between those objects and agents. In examples, the pose of an object (e.g., orientation, location, heading, etc.) can be determined with respect to a fixed coordinate frame (e.g., the world frame, a map frame, etc.), and the velocity can be determined based on tracked position over time. Additionally, or alternatively, the scene graph can represent other attributes of the objects and/or agents, such as other information detected and annotated for the objects and/or agents (e.g., whether protective equipment is present, etc.).

In some embodiments, at block 910, based on generating the scene graph, the analytics server can generate a knowledge graph that is based on the scene graph and stored contextual information (e.g., predefined behavioral models, map attributes, regulatory information, etc.). For example, the knowledge graph can represent relationships involving the one or more objects and the one or more agents in the environment for use in strategic planning of the vehicle. Additionally, or alternatively, the knowledge graph can be used to generate alerts in real time (e.g., when unsafe conditions are detected, etc.) or reports that aggregate information about the relationships represented by the knowledge graph (e.g., a number of unsafe conditions that occurred, the amount of times and/or the durations according to which they occurred, etc.). In some examples, the analytics server can then use the knowledge graph to identify interactions among objects and agents that can impact operational planning.

In embodiments, at block 912, the analytics server can generate a control signal configured to adjust an operation of the vehicle based on one or more first attributes representing first states of the one or more objects and/or one or more second attributes representing second states of the one or more agents from the knowledge graph. For example, a first attribute can correspond to an object's current position or projected trajectory, and a second attribute can include an agent's rate of movement or direction of motion (e.g., path along which the agent is moving, etc.). In at least some examples, the analytics server can determine that the first states of the one or more objects indicate a relationship that violates an operating parameter of the environment (e.g., a safe following distance, a restricted lane boundary, a right-of-way rule, etc.). In response to determining that the relationship violates the operating parameter, the analytics server can determine to generate the control signal to adjust operation of the vehicle. Alternatively, where the analytics server determines that the relationships do not violate operating parameter, the analytics server can forgo generating a control signal to update the operation of the vehicle.

In some embodiments, the analytics server can determine to adjust the operation of the vehicle. For example, the analytics server can determine that an unsafe condition is present in the environment and can cause one or more devices (e.g., motors, actuators, etc.) to reduce the speed of the vehicle from a first speed to a second speed. In this example, the analytics server can generate the control signal to cause the vehicle to operate at the second speed. For example, the analytics server can calculate a value for the second speed to satisfy the operating parameter (e.g., a speed limit or a deceleration profile). In some examples, when the vehicle is operating in accordance with a first path, the analytics server can be configured to determine to adjust the operation of the vehicle by transitioning operation of the vehicle from the first path (e.g., that intersects or is determined to intersect with paths of other objects or agents in the environment) to a second path (e.g., that does not intersect with the paths of the other objects or agents), and can generate the control signal to cause the vehicle to operate in accordance with the second path. For example, the analytics server can generate the second path based on the operating parameter associated with the relationship, such as by planning a detour to avoid an obstacle in a warehouse, etc.

In embodiments, the analytics server can provide the control signal to the vehicle to cause the operation of the vehicle. For example, the control signal can be transmitted over a wired or wireless link to a drive-by-wire system, brake actuator, or steering module of the vehicle. In at least some examples, the analytics server can include logic to allow secure communication and timely reception of the control signal by the subsystems of the vehicle, thereby allowing adjustment of the operation of the vehicle in real time based on the updated understanding of the environment.

Figure 10:
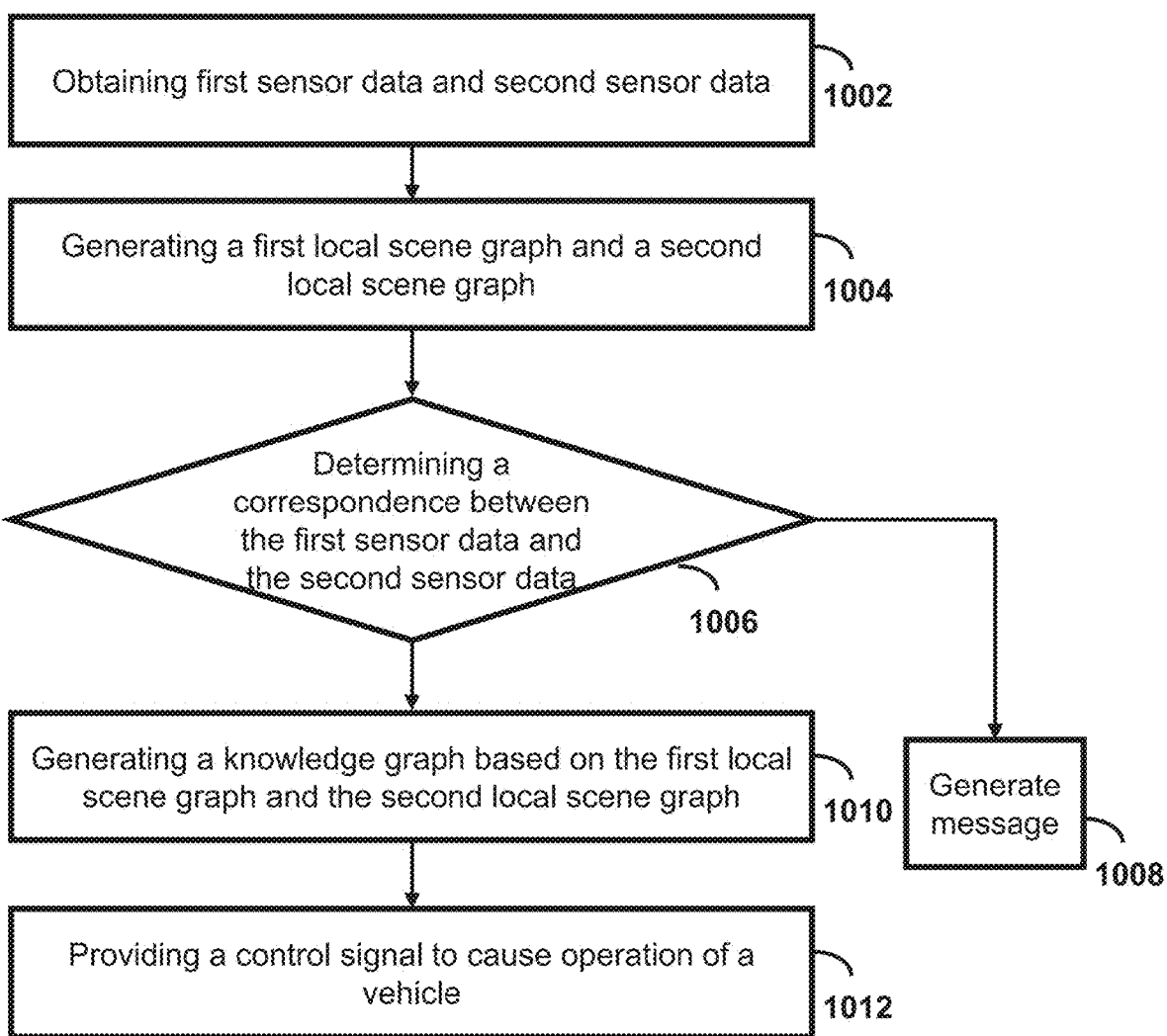
FIG. 10 is a flowchart illustrating a method for generating a knowledge graph from multi-modal sensor data and providing a control signal for vehicle operation, in accordance with one or more embodiments.

Referring now to FIG. 10, illustrated is a flowchart of a process 1000 for processing multi-modal data representing an environment during automated operation of a vehicle, according to one or more embodiments. The process 1000 can be executed, performed, or otherwise carried out by any of the computing systems or devices described herein. In some examples, the process 1000 can be executed by any suitable device of FIG. 1, such as the devices 107 or the analytics server 104. For ease of description, certain operations described as performed with respect to FIG. 10 are described as performed by an analytics server that is the same as, or similar to, the analytics server 104.

In some embodiments, at block 1002, the analytics server can obtain first sensor data and second sensor data. For example, the analytics server can obtain the first sensor data associated with a first sensor at a first location in an environment (e.g., a camera fixed on a vehicle, a roadside LiDAR unit, a thermal sensor, etc.) and can obtain the second sensor data associated with a second sensor at a second location that is within a threshold distance of the first location. In at least some examples, the analytics server can obtain the first sensor data from the first sensor and the second sensor data from the second sensor, where the first sensor is positioned in fixed relation to a vehicle (e.g., mounted on an exterior surface, integrated into a mirror assembly, embedded in a bumper, etc.) and the second sensor is positioned either in fixed relation to the vehicle or in fixed relation to a portion of the environment (e.g., infrastructure sensor pole, embedded road sensor, etc.). For example, the analytics server can process sensor data representing different sensor modalities, where the first sensor data is associated with a first sensor modality (e.g., color images, radar pulses, etc.) and the second sensor data is associated with a second sensor modality (e.g., LiDAR point clouds, ultrasonic signals, etc.).

In some embodiments, at block 1004, the analytics server can generate a first local scene graph and a second local scene graph. For example, the analytics server can generate the first local scene graph based on the first sensor data, where the first local scene graph represents a portion of the environment as perceived (e.g., that is visible) from the first location (e.g., nearby vehicles, road boundaries, traffic signs, etc.). The analytics server can generate the second local scene graph based on the second sensor data, where the second local scene graph represents a second portion of the environment as perceived from the second location (e.g., intersection features, other road users, static and dynamic obstacles, etc.). In at least some examples, the analytics server can generate each local scene graph to include nodes that represent observed objects, agents, or features (e.g., vehicles, cyclists, curbs, crosswalks, etc.) and edges that define relationships among those nodes (e.g., proximity, direction of motion, containment, etc.), allowing structured environment representations from each sensor's perspective.

In some embodiments, at block 1006, the analytics server can determine a correspondence between the first sensor data, the second sensor data, and the environment. For example, the analytics server can aggregate attributes from the first local scene graph and the second local scene graph based on the determined correspondence to generate a global scene graph that represents a holistic view of the environment. In at least some examples, the analytics server can generate a knowledge graph as a composite representation of the environment based on the global scene graph as described below. For example, the analytics server can determine one or more conflicts between the first local scene graph and the second local scene graph (e.g., inconsistent object locations, unaligned object identifications, etc.) and can aggregate the attributes based on these conflicts to address inconsistencies. In some examples, the analytics server can determine a relative pose transformation between the first sensor and the second sensor using stored calibration data (e.g., sensor calibration parameters, transformation matrices, etc.), and can transform at least one of the first local scene graph or the second local scene graph into a common coordinate frame, allowing the analytics server to generate the knowledge graph in response to the transformation and merge operation. In examples where the analytics server cannot determine a correspondence between the first sensor data and the second sensor data, the analytics server can generate a message and provide the message to one or more subsystems. This can be, for example, to indicate that there is a failure or that the vehicle is out of range of one or more sensors in the environment (e.g., of other vehicles or fixed in the environment).

In some embodiments, at block 1010, the analytics server can generate a knowledge graph based on the first local scene graph and the second local scene graph so that the knowledge graph provides a composite representation of the environment. For example, the analytics server can assign a semantic label (e.g., car, pedestrian, truck, bicycle, road sign, etc.) to nodes of a first plurality of nodes in the first local scene graph and a second plurality of nodes in the second local scene graph using a classification model (e.g., a neural network, a multi-class classifier, a support vector machine, etc.). In at least some examples, the analytics server can determine one or more overlaps between at least one first node of the first local scene graph and at least one second node of the second local scene graph based on the first node and the second node having matching semantic labels, and can merge the first node and the second node upon detecting such an overlap. In some examples, the analytics server can determine at least one first confidence score for the first node and at least one second confidence score for the second node, and can determine that these confidence scores satisfy a confidence threshold, allowing the analytics server to merge or link nodes that are reliably classified and detected across both local scene graphs in the composite knowledge graph. In this example, the analytics server can also forgo merging or linking nodes that do not have confidence scores that satisfy the confidence threshold and avoid misclassification or consolidation of object or agent annotations in the knowledge graph.

In some embodiments, at block 1012, the analytics server can provide a control signal to a vehicle based on the knowledge graph. For example, the analytics server can cause operation of the vehicle by providing the control signal to an autonomous control module, a path planning system, or a vehicle actuator interface, allowing vehicle operation (e.g., acceleration, braking, steering, etc.) to reflect the fused understanding of the environment generated from multi-sensor data and composite scene representation. In at least some examples, the analytics server can provide the control signal to respond to current scene conditions, detected objects, or environmental changes, allowing real-time adaptation of vehicle operation.

Figure 11:
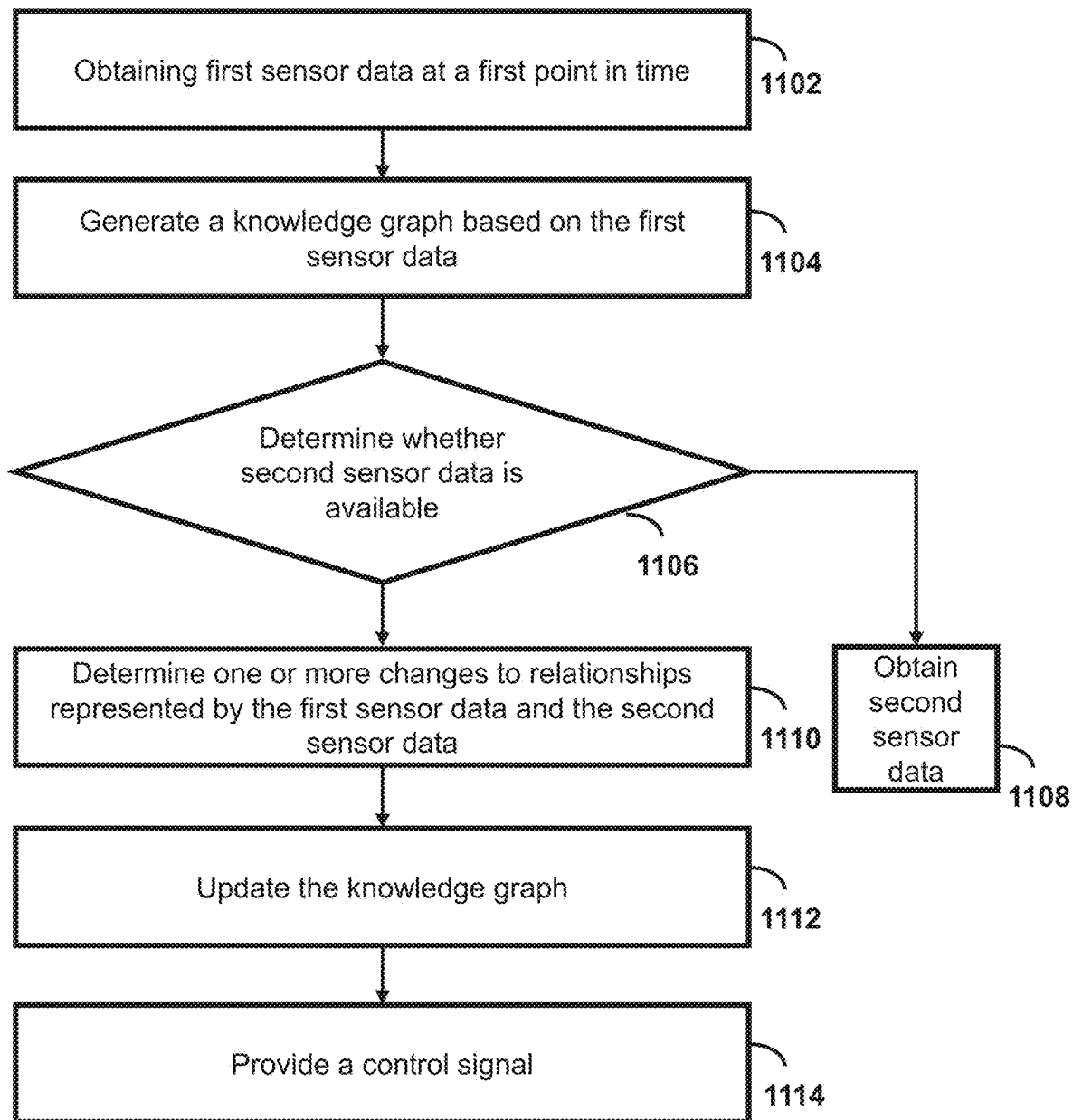
FIG. 11 is a flowchart illustrating a method for processing multi-modal data representing an environment during automated operation of a vehicle, in accordance with one or more embodiments.

Referring now to FIG. 11, illustrated is a flowchart of a process 1100 for processing multi-modal data representing an environment during automated operation of a vehicle, according to one or more embodiments. The process 1100 can be executed, performed, or otherwise carried out by any of the computing systems or devices described herein. In some examples, the process 1100 can be executed by any suitable device of FIG. 1, such as the devices 107 or the analytics server 104. For ease of description, certain operations described as performed with respect to FIG. 11 are described as performed by an analytics server that is the same as, or similar to, the analytics server 104.

In some embodiments, at block 1102, the analytics server can obtain first sensor data associated with a vehicle operating in an environment at a first point in time. For example, the analytics server can cause a vehicle to transmit sensor data generated by one or more sensing devices (e.g., camera, lidar, radar, ultrasonic sensors, etc.) that are disposed on, or otherwise supported by, the vehicle. In some examples, in response to obtaining the first sensor data, the analytics server can determine a set of features associated with the environment based on the first sensor data, where a set of features can include objects (e.g., cones, vehicles, traffic signs, animals, etc.) and agents (e.g., pedestrians, bicyclists, vehicle occupants, etc.). For example, the analytics server can generate at least one scene graph representing the environment based on the set of features, where a scene graph can encode the spatial and/or semantic relationships among the objects and agents.

In at least some examples, the first sensor data can comprise a first portion generated during operation of a first sensor and a second portion generated during operation of a second sensor, which can include data such as a camera image and corresponding lidar data collected at the first point in time. For example, the analytics server can generate a first scene graph for the first portion of the first sensor data and a second scene graph for the second portion of the first sensor data. In some examples, the analytics server can determine a correspondence between the first portion and the second portion of the first sensor data, such as by matching detected features or locations across the modalities. For example, the analytics server can aggregate attributes from the first scene graph and the second scene graph based on the correspondence to determine a global scene graph, and in at least some examples, the analytics server can determine a composite representation of the environment based on attributes from the first and second scene graphs.

In some embodiments, at block 1104, the analytics server can generate a knowledge graph based on the at least one scene graph. For example, the analytics server can generate a knowledge graph representing relationships involving one or more objects and one or more agents in the environment at the first point in time, where the knowledge graph can represent entities (e.g., objects, agents, events, etc.) and their relationships (e.g., proximity, trajectory intersection, temporal sequence, etc.) in a structured manner. In at least some examples, the analytics server can allow subsequent decision-making or planning processes based on the structured representation provided by the knowledge graph.

In embodiments, at block 1106, the analytics server can determine whether second sensor data is available. In cases where the sensor data is available, the analytics server can proceed to process the sensor data for further downstream processing (e.g., to update a knowledge graph maintained to represent operation of vehicles and/or motion of agents in an environment). Alternatively, in response to determining the sensor data is not available, at block 1108, the analytics server can obtain second sensor data associated with the vehicle at a second point in time for further processing.

In some embodiments, at block 1110, the analytics server can continue by determining one or more changes to relationships represented by the first sensor data and the second sensor data. For example, the analytics server can process the differences between the scene graphs or knowledge graphs corresponding to different time points to identify changes such as agents changing direction, objects being moved, or spatial configurations shifting. In at least some examples, the analytics server can update linked records in the knowledge graph to reflect changes in location, speed, state, or classification.

In embodiments, at block 1112, the analytics server can update the knowledge graph based on the one or more changes to the relationships. For example, the analytics server can associate timestamps, track feature updates, or revise relationship edges between nodes in the knowledge graph to maintain an up-to-date representation of the environment. In at least some examples, the analytics server can then store the updated knowledge graph in memory (e.g., a local memory, a distributed data store, etc.) so that subsequent modules can access the updated environment representation for autonomous decision making or assistance features.

In some embodiments, still at block 1114, the analytics server can, in response to updating the knowledge graph, provide a control signal to adjust operation of the vehicle using the updated knowledge graph. For example, the analytics server can track movement of the objects and agents in the environment based on the changes to relationships stored in the knowledge graph, where the analytics server can detect behaviors such as crossing paths, stopping objects, or emerging obstacles. In some examples, the analytics server can, in response to tracking the movement of the objects and agents, determine that operation of the vehicle does not satisfy one or more operational requirements at the second point in time or a third point in time, such as safe distances, path separation, or regulatory constraints. For example, the analytics server can generate the control signal to adjust the operation of the vehicle to satisfy the operational requirements at the third point in time, where operational requirements can include operating below a threshold speed when the vehicle is within a predetermined distance from at least one object or agent, or operating the vehicle in accordance with a first path that is separated from a second path for objects or agents operating in the environment. In at least some examples, the analytics server can determine that the vehicle is operating in accordance with a first path that at least in part overlaps with one or more second paths of the objects or the agents and generate a control signal to alter the vehicle trajectory or behavior to reduce risks or satisfy rules.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The present techniques will be better understood with reference to the following enumerated embodiments:

1. Methods for processing multi-modal data representing an environment to generate scene graphs of the environment.

2. The method of any one of the preceding embodiments comprising: obtaining sensor data associated with a vehicle (or device (e.g., autonomous device or semi-autonomous device), such as a vehicle, drone swarms, drones, robots, edge cameras, etc.) operating in an environment, the sensor data comprising a first portion associated with a first sensor and a second portion associated with a second sensor; determining a set of features associated with the environment based on the sensor data, the set of features comprising one or more objects and one or more agents; in response to determining the set of features, generating a scene graph representing poses and velocities of the one or more objects and the one or more agents relative to the environment; in response to generating the scene graph, generating a knowledge graph based on the scene graph and stored contextual information, the knowledge graph representing relationships involving the one or more objects and the one or more agents in the environment for use in strategic planning of the vehicle; generating a control signal configured to adjust an operation of the vehicle based on one or more first attributes representing first states of the one or more objects or one or more second attributes representing second states of the one or more agents from the knowledge graph; and providing a control signal to the vehicle to cause operation of a vehicle based on the knowledge graph based on determining one or more conditions are indicated by the knowledge graph.

3. The method of any one of the preceding embodiments, wherein the sensor data comprises first sensor data, the method further comprising: obtaining second sensor data associated with the vehicle operating in the environment, the second sensor data comprising a third portion associated with the first sensor and a fourth portion associated with the second sensor, the second sensor data generated after the first sensor data is generated; and updating at least one relationship represented by the knowledge graph based on second sensor data.

4. The method of any one of the preceding embodiments, wherein the control signal comprises a first control signal, the method further comprising: generating a second control signal configured to adjust the operation of the vehicle in response to updating the knowledge graph.

5. The method of any one of the preceding embodiments, further comprising: determining that the first states of the one or more objects indicates a relationship that violates an operating parameter of the environment; and in response to determining that the relationship violates the operating parameter, determining to generate the control signal to adjust operation of the vehicle.

6. The method of any one of the preceding embodiments, wherein determining to generate the control signal comprises: determining to adjust the operation of the vehicle by reducing a speed of the vehicle from a first speed to a second speed, and generating the control signal to cause the vehicle to operate at the second speed.

7. The method of any one of the preceding embodiments, wherein the vehicle is operating in accordance with a first path, and wherein determining to generate the control signal comprises: determining to adjust the operation of the vehicle by transitioning operation of the vehicle from a first path to a second path, and generating the control signal to cause the vehicle to operate in accordance with the second path.

8. The method of any one of the preceding embodiments, further comprising: generating the second path based on the operating parameter associated with the relationship.

9. Methods for processing multi-modal data representing an environment to generate scene graphs of the environment during automated operation of a vehicle 10. The method of any one of the preceding embodiments comprising: obtaining first sensor data associated with a first sensor at a first location in an environment and second sensor data associated with a second sensor at a second location that is within a threshold distance of the first location; generating a first local scene graph based on the first sensor data, and a second local scene graph based on the second sensor data, the first local scene graph representing a first portion of the environment visible from the first location and the second local scene graph representing a second portion of the environment visible from the second location; generating a knowledge graph based on the first local scene graph and the second local scene graph, the knowledge graph comprising a composite representation of the environment; and providing a control signal to the vehicle to cause operation of a vehicle based on the knowledge graph based on determining one or more conditions are indicated by the knowledge graph.

11. The method of any one of the preceding embodiments, wherein obtaining the first sensor data and the second sensor data comprises: obtaining the first sensor data from the first sensor and the second sensor data from the second sensor, the first sensor positioned in fixed relation to the vehicle and the second sensor positioned in fixed relation to the vehicle or in fixed relation to the environment.

12. The method of any one of the preceding embodiments, wherein the first sensor data is associated with a first sensor modality and the second sensor data is associated with a second sensor modality, the method further comprising: determining a correspondence between the first sensor data, the second sensor data, and the environment; and aggregating attributes from the first local scene graph and the second local scene graph based on the correspondence to determine a global scene graph, and wherein generating the knowledge graph comprises determining the composite representation of the environment based on the global scene graph.

13. The method of any one of the preceding embodiments, further comprising: determining one or more conflicts between the first local scene graph and the second local scene graph, wherein aggregating the attributes comprises: aggregating the attributes based on the one or more conflicts between the first local scene graph and the second local scene graph to address conflicts between the first local scene graph and the second local scene graph.

14. The method of any one of the preceding embodiments, further comprising: determining a relative pose transformation between the first sensor and the second sensor based on stored calibration data; transforming at least one of the first local scene graph and the second local scene graph into a common coordinate frame based on the relative pose transformation, wherein generating the knowledge graph comprises: generating the knowledge graph in response to transforming the at least one of the first local scene graph and the second local scene graph.

15. The method of any one of the preceding embodiments, further comprising: assigning a semantic label to nodes of a first plurality of nodes in the first local scene graph and a second plurality of nodes in the second local scene graph using a classification model, wherein generating the knowledge graph comprises: determining at least one overlap between at least one first node of the first local scene graph and at least one second node of the second local scene graph based on the at least one first node and the at least one second node having matching semantic labels; and merging the at least one first node of the first local scene graph and the at least one second node of the second local scene graph.

16. The method of any one of the preceding embodiments, further comprising: determining at least one first confidence score for the at least one first node and at least one second confidence score for the at least one second node, wherein determining the at least one overlap comprises: determining that the at least one first confidence score and the at least one second confidence score satisfy a confidence threshold; and determining the at least one overlap based on the at least one first confidence score and the at least one second confidence score.

17. Methods for processing multi-modal data representing an environment during automated operation of a vehicle 18. The method of any one of the preceding embodiments comprising: obtaining first sensor data associated with a vehicle operating in an environment at a first point in time; generating a knowledge graph based on the first sensor data, the knowledge graph representing relationships involving one or more objects and one or more agents in the environment at the first point in time; in response to obtaining second sensor data associated with the vehicle at a second point in time, determining one or more changes to the relationships involving the one or more objects and the one or more agents; updating the knowledge graph based on the one or more changes to the relationships; and in response to updating the knowledge graph, providing a control signal to the vehicle to cause operation of a vehicle based on the knowledge graph based on determining one or more conditions are indicated by the knowledge graph.

19. The method of any one of the preceding embodiments, further comprising: in response to obtaining the first sensor data, determining a set of features associated with the environment based on the first sensor data, the set of features comprising the one or more objects and the one or more agents; and generating at least one scene graph representing the environment based on the set of features, wherein generating the knowledge graph comprises: generating the knowledge graph based on the at least one scene graph.

20. The method of any one of the preceding embodiments, wherein the first sensor data comprises a first portion generated during operation of a first sensor of the vehicle and a second portion generated during operation of a second sensor, wherein generating the at least one scene graph comprises: generating a first scene graph for the first portion of the first sensor data and a second scene graph for the second portion of the first sensor data.

21. The method of any one of the preceding embodiments, further comprising: determining a correspondence between the first portion and the second portion of the first sensor data; and aggregating attributes from the first scene graph and the second scene graph based on the correspondence to determine a global scene graph, wherein generating the knowledge graph comprises: determining a composite representation of the environment based on attributes from the first scene graph and the second scene graph.

22. The method of any one of the preceding embodiments, further comprising: tracking movement of the one or more objects and the one or more agents in the environment based on the one or more changes to the relationships; in response to tracking the movement of the one or more objects and the one or more agents, determining that operation of the vehicle does not satisfy one or more operational requirements at the second point in time or a third point in time; and generating the control signal to adjust the operation of the vehicle to satisfy the one or more operational requirements at the third point in time.

23. The method of any one of the preceding embodiments, wherein the one or more operational requirements comprises: operating below a threshold speed when the vehicle is within a predetermined distance from the one or more objects or the one or more agents.

24. The method of any one of the preceding embodiments, wherein the one or more operational requirements comprises: operating the vehicle in accordance with a first path that is separated from a second path for objects or agents operating in the environment.

25. The method of any one of the preceding embodiments, wherein determining that operation of the vehicle does not satisfy one or more operational requirements comprises: determining that the vehicle is operating in accordance with a first path at least in part overlaps with one or more second paths of the one or more objects or the one or more agents.

26. One or more non-transitory, computer-readable mediums storing instructions recorded thereon that, when executed by a data processing apparatus, cause the data processing apparatus to perform operations comprising those of any of embodiments 1-25.

27. A system comprising one or more processors and memory storing instructions that, when executed by the processors, cause the processors to effectuate operations comprising those of any of embodiments 1-25.

28. A system comprising means for performing any of embodiments 1-25.

What is claimed is:

1. A system for processing multi-modal data representing an environment during automated operation of a vehicle, the system comprising:
one or more processors configured to:
obtain first sensor data associated with a vehicle operating in an environment at a first point in time;
generate a knowledge graph based on the first sensor data, the knowledge graph comprising (1) a plurality of nodes representing a plurality of objects and one or more agents in the environment at the first point in time, and (2) edges between respective pairs of the plurality of nodes representing relationships between objects or agents of the respective pairs of the plurality of nodes in the environment at the first point in time;
in response to obtaining second sensor data associated with the vehicle at a second point in time, determine one or more changes to the relationships involving the objects and the agents;
update the knowledge graph based on the one or more changes to the relationships by incrementally modifying the edges and the plurality of nodes based on the determined one or more changes to the relationships involving the objects and the agents; and
in response to updating the knowledge graph, provide a control signal to the vehicle to cause operation of a vehicle based on the knowledge graph based on determining the modification to the edges between the respective pairs of the plurality of nodes of the updated knowledge graph cause the updated knowledge graph to define a predefined relationship pattern indicating an unsafe condition is present in the environment.

2. The system of claim 1, wherein the one or more processors are further configured to:
in response to obtaining the first sensor data, determine a set of features associated with the environment based on the first sensor data, the set of features comprising the one or more objects and the one or more agents; and
generate at least one scene graph representing the environment based on the set of features,
wherein the one or more processors configured to generate the knowledge graph are configured to:
generate the knowledge graph based on the at least one scene graph.

3. The system of claim 2, wherein the first sensor data comprises a first portion generated during operation of a first sensor of the vehicle and a second portion generated during operation of a second sensor,
wherein the one or more processors configured to generate the at least one scene graph are configured to:
generate a first scene graph for the first portion of the first sensor data and a second scene graph for the second portion of the first sensor data.

4. The system of claim 3, wherein the one or more processors are further configured to:
determine a correspondence between the first portion and the second portion of the first sensor data; and
aggregate attributes from the first scene graph and the second scene graph based on the correspondence to determine a global scene graph,
wherein the one or more processors configured to generate the knowledge graph are configured to:
determine a composite representation of the environment based on attributes from the first scene graph and the second scene graph.

5. The system of claim 1, wherein the one or more processors are further configured to:
track movement of the one or more objects and the one or more agents in the environment based on the one or more changes to the relationships;
in response to tracking the movement of the one or more objects and the one or more agents, determining that operation of the vehicle does not satisfy one or more operational requirements at the second point in time or a third point in time; and generate the control signal to adjust the operation of the vehicle to satisfy the one or more operational requirements at the third point in time.

6. The system of claim 5, wherein the one or more operational requirements comprises operating below a threshold speed when the vehicle is within a predetermined distance from the one or more objects or the one or more agents.

7. The system of claim 5, wherein the one or more operational requirements comprises:

operating the vehicle in accordance with a first path that is separated from a second path for objects or agents operating in the environment.

8. The system of claim 5, wherein the one or more processors configured to determine that operation of the vehicle does not satisfy one or more operational requirements are configured to:

determine that the vehicle is operating in accordance with a first path at least in part overlaps with one or more second paths of the one or more objects or the one or more agents.

9. A method for processing multi-modal data representing an environment during automated operation of a vehicle, the method comprising:

obtaining first sensor data associated with a vehicle operating in an environment at a first point in time;

generating a knowledge graph based on the first sensor data, the knowledge graph comprising (1) a plurality of nodes representing a plurality of objects and one or more agents in the environment at the first point in time, and (2) edges between respective pairs of the plurality of nodes representing relationships in the environment at the first point in time;

in response to obtaining second sensor data associated with the vehicle at a second point in time, determining one or more changes to the relationships involving the objects and the agents;

updating the knowledge graph based on the one or more changes to the relationships by incrementally modifying the edges and the plurality of nodes based on the determined one or more changes to the relationships involving the objects and the agents; and in response to updating the knowledge graph, providing a control signal to the vehicle to cause operation of a vehicle based on determining the modification to the edges between the respective pairs of the plurality of nodes of the updated knowledge graph cause the updated knowledge graph to define a predefined relationship pattern.

10. The method of claim 9, further comprising:

in response to obtaining the first sensor data, determining a set of features associated with the environment based on the first sensor data, the set of features comprising the one or more objects and the one or more agents; and generating at least one scene graph representing the environment based on the set of features, wherein generating the knowledge graph comprises:

generating the knowledge graph based on the at least one scene graph.

11. The method of claim 10, wherein the first sensor data comprises a first portion generated during operation of a first sensor of the vehicle and a second portion generated during operation of a second sensor, wherein generating the at least one scene graph comprises:

generating a first scene graph for the first portion of the first sensor data and a second scene graph for the second portion of the first sensor data.

12. The method of claim 11, further comprising:

determining a correspondence between the first portion and the second portion of the first sensor data; and aggregating attributes from the first scene graph and the second scene graph based on the correspondence to determine a global scene graph, wherein generating the knowledge graph comprises:

determining a composite representation of the environment based on attributes from the first scene graph and the second scene graph.

13. The method of claim 9, further comprising:

tracking movement of the one or more objects and the one or more agents in the environment based on the one or more changes to the relationships;

in response to tracking the movement of the one or more objects and the one or more agents, determining that operation of the vehicle does not satisfy one or more operational requirements at the second point in time or a third point in time; and generating the control signal to adjust the operation of the vehicle to satisfy the one or more operational requirements at the third point in time.

14. The method of claim 13, wherein the one or more operational requirements comprises: operating below a threshold speed when the vehicle is within a predetermined distance from the one or more objects or the one or more agents.

15. The method of claim 13, wherein the one or more operational requirements comprises: operating the vehicle in accordance with a first path that is separated from a second path for objects or agents operating in the environment.

16. The method of claim 13, wherein determining that operation of the vehicle does not satisfy one or more operational requirements comprises:

determining that the vehicle is operating in accordance with a first path at least in part overlaps with one or more second paths of the one or more objects or the one or more agents.

17. One or more non-transitory computer-readable mediums storing instructions thereon that, when executed by one or more processors, cause the one or more processors to:

obtain first sensor data associated with a device operating in an environment at a first point in time;

generate a knowledge graph based on the first sensor data, the knowledge graph comprising (1) a plurality of nodes representing a plurality of objects and one or more agents in the environment at the first point in time, and (2) edges between respective pairs of the plurality of nodes representing relationships between objects or agents of the respective pairs of the plurality of nodes in the environment at the first point in time;

in response to obtaining second sensor data associated with the device at a second point in time, determine one or more changes to the relationships involving the objects and the agents;

update the knowledge graph based on the one or more changes to the relationships by incrementally modifying the edges and the plurality of nodes based on the determined one or more changes to the relationships involving the objects and the agents; and in response to updating the knowledge graph, provide a control signal to the device to cause operation of a device based on determining the modification to the edges between the respective pairs of the plurality of nodes of the updated knowledge graph cause the updated knowledge graph to define a predefined relationship pattern.

18. The one or more non-transitory computer-readable mediums of claim 17, wherein the instructions further cause the one or more processors to:

in response to obtaining the first sensor data, determine a set of features associated with the environment based on the first sensor data, the set of features comprising the one or more objects and the one or more agents; and generate at least one scene graph representing the environment based on the set of features, wherein the instructions that cause the one or more processors to generate the knowledge graph cause the one or more processors to:

generate the knowledge graph based on the at least one scene graph.

19. The one or more non-transitory computer-readable mediums of claim 18, wherein the first sensor data comprises a first portion generated during operation of a first sensor of the device and a second portion generated during operation of a second sensor, wherein the instructions that cause the one or more processors to generate the at least one scene graph cause the one or more processors to:

generate a first scene graph for the first portion of the first sensor data and a second scene graph for the second portion of the first sensor data.

20. The one or more non-transitory computer-readable mediums of claim 19, wherein the instructions further cause the one or more processors to:

determine a correspondence between the first portion and the second portion of the first sensor data; and aggregate attributes from the first scene graph and the second scene graph based on the correspondence to determine a global scene graph, wherein the instructions that cause the one or more processors to generate the knowledge graph cause the one or more processors to:

determine a composite representation of the environment based on attributes from the first scene graph and the second scene graph.

* * * * *